(12) United States Patent
Burns et al.

(10) Patent No.: US 12,545,930 B2
(45) Date of Patent: Feb. 10, 2026

(54) COCHLEAR INNER HAIR CELL PROMOTERS AND USES THEREOF

(71) Applicant: Decibel Therapeutics, Inc., Boston, MA (US)

(72) Inventors: Joseph Burns, Newton, MA (US); Adam Palermo, Somerville, MA (US); Gabriela Pregernig, Cambridge, MA (US); Martin Schwander, Auburndale, MA (US)

(73) Assignee: Decibel Therapeutics, Inc., Boston, MA (US)

( * ) Notice: Subject to any disclaimer, the term of this patent is extended or adjusted under 35 U.S.C. 154(b) by 738 days.

(21) Appl. No.: 17/734,246

(22) Filed: May 2, 2022

(65) Prior Publication Data

US 2022/0348965 A1 Nov. 3, 2022

Related U.S. Application Data

(63) Continuation of application No. PCT/US2020/058782, filed on Nov. 4, 2020.

(60) Provisional application No. 62/930,503, filed on Nov. 4, 2019.

(51) Int. Cl.
  *C12N 15/85* (2006.01)
  *A61K 9/00* (2006.01)
  *A61K 35/761* (2015.01)
  *A61P 27/00* (2006.01)
  *C12N 15/864* (2006.01)

(52) U.S. Cl.
  CPC ........ *C12N 15/8645* (2013.01); *A61K 9/0046* (2013.01); *A61K 35/761* (2013.01); *A61P 27/00* (2018.01)

(58) Field of Classification Search
  CPC .............. C12N 15/8645; A61K 35/761; A61K 9/0046; A61P 27/00
  See application file for complete search history.

(56) References Cited

U.S. PATENT DOCUMENTS

2018/0369414 A1  12/2018  Stankovic et al.

FOREIGN PATENT DOCUMENTS

| WO | WO-2012/065143 A1 | 5/2012 |
| WO | WO-2016/170348 A2 | 10/2016 |
| WO | WO-2017/100791 A1 | 6/2017 |

(Continued)

OTHER PUBLICATIONS

BLAST alignment of SEQ ID No. 18638 to *Homo sapiens* chromosome 11 performed Apr. 18, 2025 (Year: 2025).*

(Continued)

*Primary Examiner* — David W Berke-Schlessel
*Assistant Examiner* — Trent R Clarke
(74) *Attorney, Agent, or Firm* — Clark & Elbing LLP

(57) ABSTRACT

The disclosure provides polynucleotides containing inner hair cell-specific promoters, as well as vectors containing the same, that can be used to promote expression of a transgene specifically in inner hair cells. The polynucleotides described herein may be operably linked to a transgene, such as a transgene encoding a therapeutic protein, so as to promote inner hair cell-specific expression of the transgene. The polynucleotides described herein may be operably linked to a therapeutic transgene and used for the treatment of subjects having or at risk of developing hearing loss.

12 Claims, 8 Drawing Sheets

Specification includes a Sequence Listing.

(56) References Cited

FOREIGN PATENT DOCUMENTS

| WO | WO-2019/138030 A1 | 7/2019 | | |
|---|---|---|---|---|
| WO | WO-2019/154939 A1 | 8/2019 | | |
| WO | WO-2019/162396 A1 | 8/2019 | | |
| WO | WO-2018145111 A9 * | 8/2019 | ........... | A61K 48/005 |
| WO | WO-2019/210181 A1 | 10/2019 | | |

OTHER PUBLICATIONS

Genbank, "Mus musculus strain C57BL/6J chromosome 19, GRCm38. p6 C57BL/6J," <https://www.ncbi.nlm.nih.gov/nuccore/NC_000085.6>, published Aug. 2019 (1 page).

Genbank, "*Homo sapiens* chromosome 11, GRCh38.p13 Primary Assembly," <https://www.ncbi.nlm.nih.gov/nuccore/NC_000001.10/>, published Sep. 2019 (3 pages).

Yang et al., "Functions of CaBP1 and CaBP2 in the peripheral auditory system," available in PMC Jan. 11, 2020, published in final edited form as: Hear Res. 364:48-58 (Jul. 2018) (27 pages).

Akil et al., "Dual AAV-mediated gene therapy restores hearing in a DFNB9 mouse model," Proceeding of the National Academy of Science. 116(10):4496-4501 (Feb. 2019) (6 pages).

Moore et al., "Development of the cat peripheral auditory system: input-output functions of cochlear potentials," Brain Research, Elsevier, Amsterdamn, NL. 219(1):29-44 (Aug. 1981) (16 pages).

Schrauwen et al., "A Mutation in CABP2, Expressed in Cochlear Hair Cells, Causes Autosomal-Recessive Hearing Impairment," The American Journal of Human Genetics. 91(4):636-645 (Oct. 2012).

Genbank, "Mus musculus targeted non-conditional, lacZ-tagged mutant allele Cabp2:tm1e(KOMP)Ucd; transgenic," <https://www.ncbi.nlm.nih.gov/nuccore/JN945558.1>, retrieved Mar. 8, 2021 (11 pages).

International Search Report and Written Opinion for International Patent Application No. PCT/US20/58782, mailed Mar. 26, 2021 (15 pages).

GenBank Accession No. AC109138.10, "Mus musculus chromosome 19, clone RP23-41B18, complete sequence" (72 pages) (Oct. 2003).

GenBank Accession No. AP001184.4, "*Homo sapiens* genomic DNA, chromosome 11q clone:RP11-715F10, complete sequences" (25 pages) (Apr. 2002).

\* cited by examiner

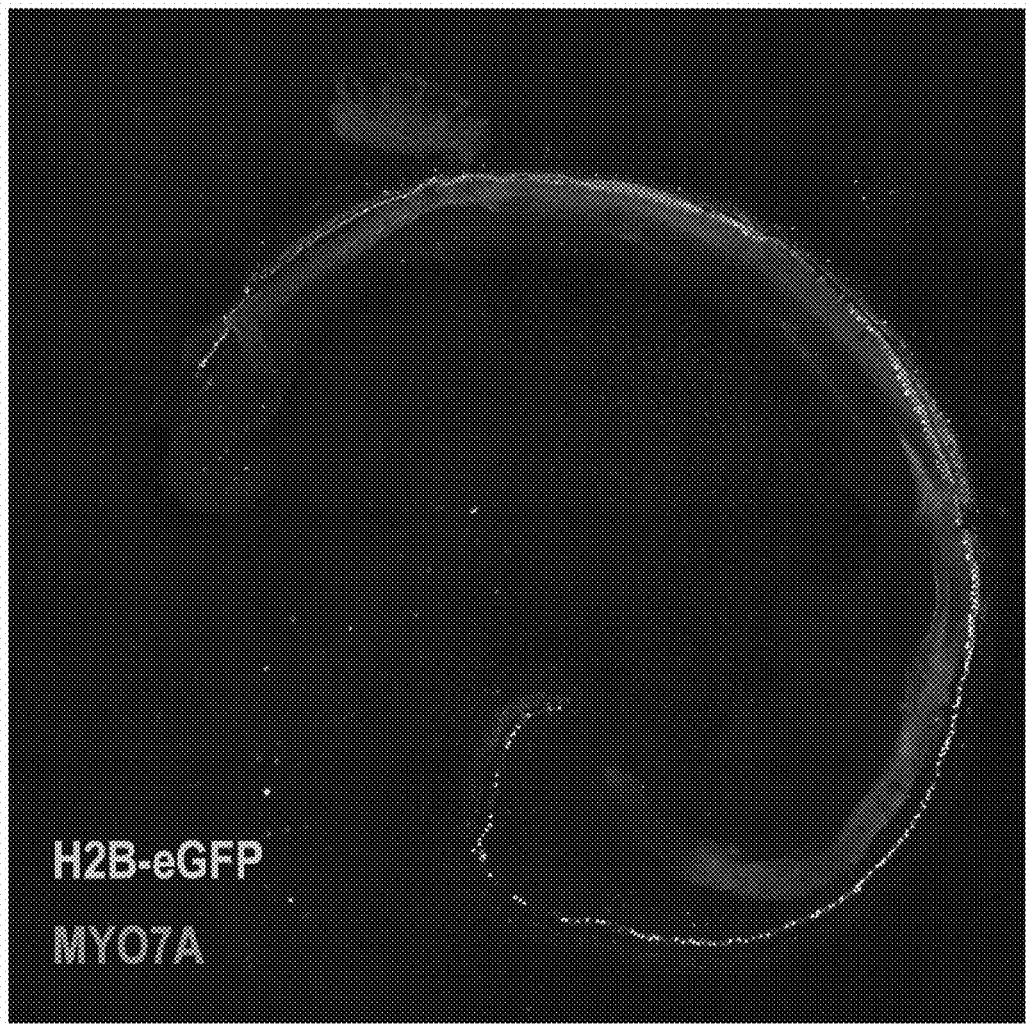

COCHLEAR INNER HAIR CELL PROMOTERS AND USES THEREOF

SEQUENCE LISTING

The instant application contains a Sequence Listing which has been submitted electronically in ASCII format and is hereby incorporated by reference in its entirety. The ASCII copy, created on Apr. 27, 2022, is named 51471-005003_Sequence_Listing_4_27_22_ST25 and is 7,155 bytes in size.

BACKGROUND

Hearing loss is a major public health issue that is estimated to affect nearly 15% of school-age children and one out of three people by age sixty-five. The most common type of hearing loss is sensorineural hearing loss, a type of hearing loss caused by defects in the cells of the inner ear, such as cochlear inner hair cells, or the neural pathways that project from the inner ear to the brain. Sensorineural hearing loss is often acquired, and has a variety of causes, including acoustic trauma, disease or infection, head trauma, ototoxic drugs, and aging. There are also genetic causes of sensorineural hearing loss, such as mutations in genes involved in the development and function of the inner ear. Mutations in over 90 such genes have been identified, including mutations inherited in an autosomal recessive, autosomal dominant, and X-linked pattern.

In recent years, efforts to treat hearing loss have increasingly focused on gene therapy as a possible solution; however, there remain few approaches to specifically target hair cells, which are frequently implicated in hearing loss. There is a need for new therapeutics to target hair cells for the treatment of sensorineural hearing loss.

SUMMARY OF THE INVENTION

The invention provides compositions and methods for promoting the expression of a gene of interest, such as a gene that promotes or improves hair cell function, regeneration, or survival, in specific cell types. The compositions and methods described herein relate to polynucleotides that stimulate transcription of a transgene in cochlear hair cells (e.g., inner hair cells (IHCs)) of the inner ear. The polynucleotides described herein may be operably linked to a transgene, and may be administered to a patient to treat or prevent hearing loss (e.g., sensorineural hearing loss).

In a first aspect, the invention provides a nucleic acid vector including a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of SEQ ID NOs: 1-3. In some embodiments, the polynucleotide has at least 85% sequence identity (e.g., 85%, 86%, 87%, 88%, 89%, 90%, 91%, 92%, 93%, 94%, 95%, 96%, 97%, 98%, 99%, or more, sequence identity) to SEQ ID NO: 1. In some embodiments, the polynucleotide has at least 85% sequence identity (e.g., 85%, 86%, 87%, 88%, 89%, 90%, 91%, 92%, 93%, 94%, 95%, 96%, 97%, 98%, 99%, or more, sequence identity) to SEQ ID NO: 2. In some embodiments, the polynucleotide has at least 85% sequence identity (e.g., 85%, 86%, 87%, 88%, 89%, 90%, 91%, 92%, 93%, 94%, 95%, 96%, 97%, 98%, 99%, or more, sequence identity) to SEQ ID NO: 3.

In some embodiments, the polynucleotide is operably linked to a transgene. In some embodiments, the transgene is a heterologous transgene. In some embodiments, the transgene contains a polynucleotide sequence encoding a protein (e.g., a therapeutic protein, reporter protein, or other protein of interest), a short interfering RNA (siRNA), an antisense oligonucleotide (ASO), a nuclease (e.g., CRISPR Associated Protein 9 (Cas9), Transcription Activator-Like Effector Nuclease (TALEN), Zinc Finger Nuclease (ZFN), or guide RNA (gRNA)), or is a microRNA. In some embodiments, the protein is a therapeutic protein. In some embodiments, the polynucleotide is capable of directing IHC-specific expression of the protein, siRNA, ASO, nuclease (e.g., Cas9, TALEN, ZFN, or gRNA), or microRNA from the polynucleotide sequence in a mammalian IHC. In some embodiments, the mammalian IHC is a human IHC.

In some embodiments, the therapeutic protein is Actin Gamma 1 (ACTG1), Fascin Actin-Bundling Protein 2 (FSCN2), Radixin (RDX), POU Class 4 Homeobox 3 (POU4F3), Trio And F-Actin Binding Protein (TRIOBP), Taperin (TPRN), Xin Actin Binding Repeat Containing 2 (XIRP2), Atonal BHLH Transcription Factor (ATOH1), Growth Factor Independent 1 Transcriptional Repressor (GF11), Cholinergic Receptor Nicotinic Alpha 9 Subunit (CHRNA9), Cholinergic Receptor Nicotinic Alpha 10 Subunit (CHRNA10), Calcium and Integrin Binding Family Member 3 (CIB3), Cadherin Related 23 (CDH23), Protocadherin Related 15 (PCDH15), Kinocilin (KNCN), Pejvakin (DFNB59), Otoferlin (OTOF), MKRN2 Opposite Strand (MKRN2OS), Lim Homeobox 3 (LHX3), Transmembrane Channel Like 1 (TMC1), Myosin XV (MYO15), Myosin 7A (MYO7A), Myosin VI (MYO6), Myosin IIIA (MYO3A), Myosin IIIB (MYO3B), Glutaredoxin And Cystein Rich Domain Containing 1 (GRXCR1), Protein Tyrosine Phosphatase Receptor Type Q (PTPRQ), Late Cornified Envelope 6A (LCE6A), Lipoxygenase Homology Domains 1 (LOXHD1), ADP-Ribosyltransferase 1 (ART1), ATPase Plasma Membrane Ca2+ Transporting 2 (ATP2B2), Calcium and Integrin Binding Family Member 2 (CIB2), Calcium Voltage-Gated Channel Auxilary Subunit Alpha2delta4 (CACNA2D4), Calcium-Binding Protein 2 (CABP2), Epidermal growth Factor Receptor Pathway Substrate 8 (EPS8), EPS8 Like 2 (EPS8L2), Espin (ESPN), Espin Like (ESPNL), Peripherin 2 (PRPH2), Stereocilin (STRC), Solute Carrier Family 8 Member A2 (SLC8A2), Zinc Finger CCHC-Type Containing 12 (ZCCHC12), Leucine Rich Transmembrane And O-Methyltransferase Domain Containing 2 (LRTOMT2), Leucine Rich Transmembrane And O-Methyltransferase Domain Containing 1 (LRTOMT1), USH1 Protein Network Component Harmonin (USH1C), Extracellular Leucine Rich Repeat And Fibronectin Type III Domain Containing 1 (ELFN1), Tetratricopeptide Repeat Domain 24 (TTC24), Dystrotelin (DYTN), Kielin Cysteine Rich BMP Regulator (KCP), Coiled-Coil Glutamate Rich Protein 2 (CCER2), Leucine Rich Repeats And Transmembrane Domains 2 (LRTM2), Potassium Voltage-Gated Channel Subfamily A Member 10 (KCNA10), Clarin 1 (CLRN1), Clarin 2 (CLRN2), SKI Family Transcriptional Corepressor 1 (SKOR1), Tctex1 Domain Containing 1 (TCTEX1 D1), Fc Receptor Like B (FCRLB), Solute Carrier Family 17 Member 8 (SLC17A8), Glutaredoxin And Cysteine Rich Domain Containing 2 (GRXCR2), Brain Derived Neurotrophic Factor (BDNF), Serpin Family E Member 3 (SERPINE3), Nescient Helix-Loop-Helix 1 (NHLH1), Heat Shock 70 KDa Protein 4 (HSP70), Heat Shock 90 kDa Protein 1, Alpha (HSP90), Activating Transcription Factor 6 (ATF6), Eukaryotic Translation Initiation Factor 2 Alpha Kinase 3 (PERK), Inositol-Requiring Protein 1 (IRE1), Whirlin (WHRN), Oncomodulin (OCM), LIM Homeobox 1 (ISL1), Neurotrophin 3 (NTF3), Transmembrane and Tetratricopeptide Repeat Containing 4 (TMTC4), or Binding-Immunoglobulin Protein (BIP).

In some embodiments, the nucleic acid vector is a viral vector, a plasmid, a cosmid, or an artificial chromosome. In some embodiments, the nucleic acid vector is a viral vector selected from the group including an adeno-associated virus (AAV), an adenovirus, and a lentivirus. In some embodiments, the viral vector is an AAV vector. In some embodiments, the AAV vector has an AAV1, AAV2, AAV2quad(Y-F), AAV3, AAV4, AAV5, AAV6, AAV7, AAV8, AAV9, AAV10, rh10, rh39, rh43, rh74, Anc80, Anc80L65, DJ/8, DJ/9, 7m8, PHP.B, PHP.eb, or PHP.S capsid. In some embodiments, the AAV vector has an AAV1 capsid. In some embodiments, the AAV vector has an AAV9 capsid. In some embodiments, the AAV vector has an AAV6 capsid. In some embodiments, the AAV vector has an AAV8 capsid. In some embodiments, the AAV vector has an Anc80 capsid. In some embodiments, the AAV vector has an Anc80L65 capsid. In some embodiments, the AAV vector has a DJ/9 capsid. In some embodiments, the AAV vector has a 7m8 capsid. In some embodiments, the AAV vector has an AAV2 capsid. In some embodiments, the AAV vector has a PHP.B capsid. In some embodiments, the AAV vector has an AAV2quad(Y-F) capsid.

In another aspect, the invention provides a composition containing a nucleic acid vector of the invention. In some embodiments, the composition further includes a pharmaceutically acceptable excipient.

In another aspect, the invention provides a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to SEQ ID NO: 1. In some embodiments, the polynucleotide is operably linked to a transgene. In some embodiments, the transgene encodes a protein (e.g., a therapeutic protein, reporter protein, or other protein of interest), an siRNA, an ASO, a nuclease (e.g., Cas9, TALEN, ZFN, or gRNA), or a is microRNA. In some embodiments, the protein is a therapeutic protein. In some embodiments, the therapeutic protein is ACTG1, FSCN2, RDX, POU4F3, TRIOBP, TPRN, XIRP2, ATOH1, GFI1, CHRNA9, CHRNA10, CIB3, CDH23, PCDH15, KNCN, DFNB59, OTOF, MKRN2OS, LHX3, TMC1, MYO15, MYO7A, MYO6, MYO3A, MYO3B, GRXCR1, PTPRQ, LCE6A, LOXHD1, ART1, ATP2B2, CIB2, CACNA2D4, CABP2, EPS8, EPS8L2, ESPN, ESPNL, PRPH2, STRC, SLC8A2, ZCCHC12, LRTOMT2, LRTOMT1, USH1C, ELFN1, TTC24, DYTN, KCP, CCER2, LRTM2, KCNA10, CLRN1, CLRN2, SKOR1, TCTEX1 D1, FCRLB, SLC17A8, GRXCR2, BDNF, SERPINE3, NHLH1, HSP70, HSP90, ATF6, PERK, IRE1, WHRN, OCM, ISL1, NTF3, TMTC4, or BIP.

In another aspect, the invention provides a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to SEQ ID NO: 2 or 3 operably linked to a transgene. In some embodiments, the polynucleotide has at least 85% sequence identity (e.g., 85%, 86%, 87%, 88%, 89%, 90%, 91%, 92%, 93%, 94%, 95%, 96%, 97%, 98%, 99%, or more, sequence identity) to SEQ ID NO: 2. In some embodiments, the polynucleotide has at least 85% sequence identity (e.g., 85%, 86%, 87%, 88%, 89%, 90%, 91%, 92%, 93%, 94%, 95%, 96%, 97%, 98%, 99%, or more, sequence identity) to SEQ ID NO: 3.

In some embodiments, the transgene is a heterologous transgene. In some embodiments of the foregoing aspect, the transgene encodes a protein (e.g., a therapeutic protein, reporter protein, or other protein of interest), an siRNA, an ASO, a nuclease (e.g., Cas9, TALEN, ZFN, or gRNA), or a is microRNA. In some embodiments, the protein is a therapeutic protein.

In some embodiments, the therapeutic protein is ACTG1, FSCN2, RDX, POU4F3, TRIOBP, TPRN, XIRP2, ATOH1, GFI1, CHRNA9, CHRNA10, CIB3, CDH23, PCDH15, KNCN, DFNB59, OTOF, MKRN2OS, LHX3, TMC1, MYO15, MYO7A, MYO6, MYO3A, MYO3B, GRXCR1, PTPRQ, LCE6A, LOXHD1, ART1, ATP2B2, CIB2, CACNA2D4, CABP2, EPS8, EPS8L2, ESPN, ESPNL, PRPH2, STRC, SLC8A2, ZCCHC12, LRTOMT2, LRTOMT1, USH1C, ELFN1, TTC24, DYTN, KCP, CCER2, LRTM2, KCNA10, CLRN1, CLRN2, SKOR1, TCTEX1D1, FCRLB, SLC17A8, GRXCR2, BDNF, SERPINE3, NHLH1, HSP70, HSP90, ATF6, PERK, IRE1, WHRN, OCM, ISL1, NTF3, TMTC4, or BIP.

In another aspect, the invention provides a cell (e.g., a mammalian cell, e.g., a human cell, such as an IHC) including the polynucleotide or the nucleic acid vector of any of the foregoing aspects and embodiments. In some embodiments, the cell is a mammalian IHC.

In another aspect, the invention provides a method of expressing a transgene in a mammalian IHC by contacting the mammalian IHC with a nucleic acid vector of the invention or a composition of the invention. In some embodiments, the transgene is specifically expressed in IHCs. In some embodiments, the mammalian IHC is a human IHC. In some embodiments, transgene is not substantially expressed in inner ear cells that are not IHCs.

In another aspect, the invention provides a method of treating a subject having or at risk of developing hearing loss (e.g., sensorineural hearing loss, deafness, or auditory neuropathy) by administering to the subject an effective amount of a nucleic acid vector of the invention or a composition of the invention. In some embodiments, the hearing loss is genetic hearing loss. In some embodiments, the genetic hearing loss is autosomal dominant hearing loss, autosomal recessive hearing loss, or X-linked hearing loss. In some embodiments, the hearing loss is acquired hearing loss. In some embodiments, the acquired hearing loss is noise-induced hearing loss, age-related hearing loss, disease or infection-related hearing loss, head trauma-related hearing loss, or ototoxic drug-induced hearing loss. In some embodiments, the acquired hearing loss is age-related hearing loss. In some embodiments, the hearing loss is noise-induced hearing loss. In some embodiments, the hearing loss is ototoxic drug-induced hearing loss.

In some embodiments of any of the foregoing aspects, the hearing loss is associated with loss of IHCs.

In another aspect, the invention provides a method of promoting IHC regeneration in a subject in need thereof by administering to the subject an effective amount of a nucleic acid vector of the invention or a composition of the invention.

In another aspect, the invention provides a method of preventing or reducing ototoxic drug-induced IHC damage or death in a subject in need thereof by administering to the subject an effective amount of a nucleic acid vector of the invention or a composition of the invention.

In some embodiments of any of the foregoing aspects, the ototoxic drug is selected from the group including aminoglycosides (e.g., gentamycin, neomycin, streptomycin, tobramycin, kanamycin, vancomycin, and amikacin), antineoplastic drugs (e.g., platinum-containing chemotherapeutic agents, such as cisplatin, carboplatin, and oxaliplatin), ethacrynic acid, furosemide, salicylates (e.g., aspirin, particularly at high doses), and quinine.

In another aspect, the invention provides a method of treating a subject having or at risk of developing tinnitus by administering to the subject an effective amount of a nucleic acid vector of the invention or a composition of the invention.

In another aspect, the invention provides a method of preventing or reducing IHC damage or death in a subject in need thereof by administering to the subject an effective amount of a nucleic acid vector of the invention or a composition of the invention.

In another aspect, the invention provides a method of increasing IHC survival in a subject in need thereof by administering to the subject an effective amount of a nucleic acid vector of the invention or a composition of the invention.

In another aspect, the invention provides a method of inducing or increasing IHC maturation in a subject in need thereof by administering to the subject an effective amount of a nucleic acid vector of the invention or a composition of the invention.

In some embodiments of any of the foregoing aspects, the IHC is a mammalian IHC. In some embodiments, the mammalian IHC is a human IHC.

In some embodiments of any of the foregoing aspects, the method further includes evaluating the hearing of the subject prior to administering the nucleic acid vector or composition (e.g., evaluating hearing using standard tests, such as audiometry, auditory brainstem response (ABR), electrocochleography (ECOG), or otoacoustic emissions).

In some embodiments of any of the foregoing aspects, the method further includes evaluating the hearing of the subject after administering the nucleic acid vector or composition (e.g., evaluating hearing using standard tests, such as audiometry, ABR, ECOG, or otoacoustic emissions).

In some embodiments of any of the foregoing aspects, the nucleic acid vector or composition is locally administered. In some embodiments, the nucleic acid vector or composition is administered to the ear of the subject (e.g., administered to the inner ear, e.g., into the perilymph or endolymph, such as through the oval window, round window, or horizontal canal, or by transtympanic or intratympanic injection).

In some embodiments of any of the foregoing aspects, the nucleic acid vector or composition is administered in an amount sufficient to prevent or reduce hearing loss, prevent or reduce tinnitus, delay the development of hearing loss, slow the progression of hearing loss, improve hearing, improve hair cell function (e.g., IHC function), prevent or reduce hair cell damage (e.g., IHC damage), prevent or reduce hair cell death (e.g., IHC death), increase hair cell maturation (e.g., IHC maturation), promote or increase hair cell survival (e.g., IHC survival), or increase hair cell numbers (e.g., IHC numbers).

In some embodiments of any of the foregoing aspects, the subject is a human.

In another aspect, the invention provides a kit containing a nucleic acid vector of the invention or a composition of the invention.

Definitions

As used herein, the term "about" refers to a value that is within 10% above or below the value being described.

As used herein, "administration" refers to providing or giving a subject a therapeutic agent (e.g., a nucleic acid vector containing an inner hair cell (IHC)-specific promoter operably linked to a transgene), by any effective route. Exemplary routes of administration are described herein below.

As used herein, the term "cell type" refers to a group of cells sharing a phenotype that is statistically separable based on gene expression data. For instance, cells of a common cell type may share similar structural and/or functional characteristics, such as similar gene activation patterns and antigen presentation profiles. Cells of a common cell type may include those that are isolated from a common tissue (e.g., epithelial tissue, neural tissue, connective tissue, or muscle tissue) and/or those that are isolated from a common organ, tissue system, blood vessel, or other structure and/or region in an organism.

As used herein, the terms "conservative mutation," "conservative substitution," and "conservative amino acid substitution" refer to a substitution of one or more amino acids for one or more different amino acids that exhibit similar physicochemical properties, such as polarity, electrostatic charge, and steric volume. These properties are summarized for each of the twenty naturally-occurring amino acids in table 1, below.

TABLE 1

Representative physicochemical properties of naturally-occurring amino acids

| Amino Acid | 3 Letter Code | 1 Letter Code | Side-chain Polarity | Electrostatic character at physiological pH (7.4) | Steric Volume[†] |
| --- | --- | --- | --- | --- | --- |
| Alanine | Ala | A | nonpolar | neutral | small |
| Arginine | Arg | R | polar | cationic | large |
| Asparagine | Asn | N | polar | neutral | intermediate |
| Aspartic acid | Asp | D | polar | anionic | intermediate |
| Cysteine | Cys | C | nonpolar | neutral | intermediate |
| Glutamic acid | Glu | E | polar | anionic | intermediate |
| Glutamine | Gln | Q | polar | neutral | intermediate |
| Glycine | Gly | G | nonpolar | neutral | small |
| Histidine | His | H | polar | Both neutral and cationic forms in equilibrium at pH 7.4 | large |
| Isoleucine | Ile | I | nonpolar | neutral | large |
| Leucine | Leu | L | nonpolar | neutral | large |
| Lysine | Lys | K | polar | cationic | large |
| Methionine | Met | M | nonpolar | neutral | large |
| Phenylalanine | Phe | F | nonpolar | neutral | large |

TABLE 1-continued

Representative physicochemical properties of naturally-occurring amino acids

| Amino Acid | 3 Letter Code | 1 Letter Code | Side-chain Polarity | Electrostatic character at physiological pH (7.4) | Steric Volume[†] |
|---|---|---|---|---|---|
| Proline | Pro | P | non-polar | neutral | intermediate |
| Serine | Ser | S | polar | neutral | small |
| Threonine | Thr | T | polar | neutral | intermediate |
| Tryptophan | Trp | W | nonpolar | neutral | bulky |
| Tyrosine | Tyr | Y | polar | neutral | large |
| Valine | Val | V | nonpolar | neutral | intermediate |

[†]based on volume in $Å^3$: 50-100 is small, 100-150 is intermediate, 150-200 is large, and >200 is bulky From this table it is appreciated that the conservative amino acid families include (i) G, A, V, L and I; (ii) D and E; (iii) C, S and T; (iv) H, K and R; (v) N and Q; and (vi) F, Y and W. A conservative mutation or substitution is therefore one that substitutes one amino acid for a member of the same amino acid family (e.g., a substitution of Ser for Thr or Lys for Arg).

As used herein, the terms "effective amount," "therapeutically effective amount," and a "sufficient amount" of a composition, vector construct, or viral vector described herein refer to a quantity sufficient to, when administered to the subject, including a mammal, for example a human, effect beneficial or desired results, including clinical results, and, as such, an "effective amount" or synonym thereto depends upon the context in which it is being applied. For example, in the context of treating sensorineural hearing loss, it is an amount of the composition, vector construct, or viral vector sufficient to achieve a treatment response as compared to the response obtained without administration of the composition, vector construct, or viral vector. The amount of a given composition described herein that will correspond to such an amount will vary depending upon various factors, such as the given agent, the pharmaceutical formulation, the route of administration, the type of disease or disorder, the identity of the subject (e.g. age, sex, weight) or host being treated, and the like, but can nevertheless be routinely determined by one skilled in the art. Also, as used herein, a "therapeutically effective amount" of a composition, vector construct, or viral vector of the present disclosure is an amount which results in a beneficial or desired result in a subject as compared to a control. As defined herein, a therapeutically effective amount of a composition, vector construct, or viral vector of the present disclosure may be readily determined by one of ordinary skill by routine methods known in the art. Dosage regimen may be adjusted to provide the optimum therapeutic response.

As used herein, the term "endogenous" refers to a molecule (e.g., a polypeptide, nucleic acid, or cofactor) that is found naturally in a particular organism (e.g., a human) or in a particular location within an organism (e.g., an organ, a tissue, or a cell, such as a human cell, e.g., an IHC).

As used herein, the term "express" refers to one or more of the following events: (1) production of an RNA template from a DNA sequence (e.g., by transcription); (2) processing of an RNA transcript (e.g., by splicing, editing, 5' cap formation, and/or 3' end processing); (3) translation of an RNA into a polypeptide or protein; and (4) post-translational modification of a polypeptide or protein.

As used herein, the term "exogenous" describes a molecule (e.g., a polypeptide, nucleic acid, or cofactor) that is not found naturally in a particular organism (e.g., a human) or in a particular location within an organism (e.g., an organ, a tissue, or a cell, such as a human cell, e.g., a human IHC).

Exogenous materials include those that are provided from an external source to an organism or to cultured matter extracted there from.

As used herein, the term "exon" refers to a region within the coding region of a gene, the nucleotide sequence of which determines the amino acid sequence of the corresponding protein. The term exon also refers to the corresponding region of the RNA transcribed from a gene. Exons are transcribed into pre-mRNA, and may be included in the mature mRNA depending on the alternative splicing of the gene. Exons that are included in the mature mRNA following processing are translated into protein, wherein the sequence of the exon determines the amino acid composition of the protein.

As used herein, the term "heterologous" refers to a combination of elements that is not naturally occurring. For example, a heterologous transgene refers to a transgene that is not naturally expressed by the promoter to which it is operably linked.

As used herein, the term "inner hair cell-specific expression" or "IHC-specific expression" refers to production of an RNA transcript or polypeptide primarily within cochlear IHCs as compared to other cell types of the cochlea (e.g., spiral ganglion neurons, glia, or other cochlear cell types). IHC-specific expression of a transgene can be confirmed by comparing transgene expression (e.g., RNA or protein expression) between various cell types of the cochlea (e.g., IHCs vs. non-IHCs) using any standard technique (e.g., quantitative RT PCR, immunohistochemistry, Western Blot analysis, or measurement of the fluorescence of a reporter (e.g., GFP) operably linked to a promoter). An IHC-specific promoter induces expression (e.g., RNA or protein expression) of a transgene to which it is operably linked that is at least 50% greater (e.g., 50%, 75%, 100%, 125%, 150%, 175%, 200% greater or more) in IHCs compared to at least 2 (e.g., 2, 3, 4, 5, 6, 7, 8, 9, 10, or more) of the following inner ear cell types: outer hair cells, Border cells, inner phalangeal cells, inner pillar cells, outer pillar cells, first row Deiter cells, second row Deiter cells, third row Deiter cells, Hensen's cells, Claudius cells, inner sulcus cells, outer sulcus cells, spiral prominence cells, root cells, interdental cells, basal cells of the stria vascularis, intermediate cells of the stria vascularis, marginal cells of the stria vascularis, spiral ganglion neurons, Schwann cells. An IHC-specific promoter induces expression (e.g., RNA or protein expression) of a transgene to which it is operably linked that is at least 50% greater (e.g., 50%, 75%, 100%, 125%, 150%, 175%, 200% greater or more) in IHCs of the cochlea compared to other cells of the cochlea.

As used herein, the terms "increasing" and "decreasing" refer to modulating resulting in, respectively, greater or lesser amounts, of function, expression, or activity of a metric relative to a reference. For example, subsequent to administration of a composition in a method described herein, the amount of a marker of a metric (e.g., transgene expression) as described herein may be increased or decreased in a subject by at least 5%, 10%, 15%, 20%, 25%, 30%, 35%, 40%, 45%, 50%, 55%, 60%, 65%, 70%, 75%, 80%, 85%, 90%, 95% or 98% or more relative to the amount of the marker prior to administration. Generally, the metric is measured subsequent to administration at a time that the administration has had the recited effect, e.g., at least one week, one month, 3 months, or 6 months, after a treatment regimen has begun.

As used herein, the term "intron" refers to a region within the coding region of a gene, the nucleotide sequence of which is not translated into the amino acid sequence of the corresponding protein. The term intron also refers to the corresponding region of the RNA transcribed from a gene. Introns are transcribed into pre-mRNA, but are removed during processing, and are not included in the mature mRNA.

As used herein, "locally" or "local administration" means administration at a particular site of the body intended for a local effect and not a systemic effect. Examples of local administration are epicutaneous, inhalational, intra-articular, intrathecal, intravaginal, intravitreal, intrauterine, intra-lesional administration, lymph node administration, intratumoral administration, administration to the inner ear, and administration to a mucous membrane of the subject, wherein the administration is intended to have a local and not a systemic effect.

As used herein, the term "operably linked" refers to a first molecule joined to a second molecule, wherein the molecules are so arranged that the first molecule affects the function of the second molecule. The two molecules may or may not be part of a single contiguous molecule and may or may not be adjacent. For example, a promoter is operably linked to a transcribable polynucleotide molecule if the promoter modulates transcription of the transcribable polynucleotide molecule of interest in a cell. Additionally, two portions of a transcription regulatory element are operably linked to one another if they are joined such that the transcription-activating functionality of one portion is not adversely affected by the presence of the other portion. Two transcription regulatory elements may be operably linked to one another by way of a linker polynucleotide (e.g., an intervening non-coding polynucleotide) or may be operably linked to one another with no intervening nucleotides present.

As used herein, the term "plasmid" refers to a to an extrachromosomal circular double stranded DNA molecule into which additional DNA segments may be ligated. A plasmid is a type of vector, a nucleic acid molecule capable of transporting another nucleic acid to which it has been linked. Certain plasmids are capable of autonomous replication in a host cell into which they are introduced (e.g., bacterial plasmids having a bacterial origin of replication and episomal mammalian plasmids). Other vectors (e.g., non-episomal mammalian vectors) can be integrated into the genome of a host cell upon introduction into the host cell, and thereby are replicated along with the host genome. Certain plasmids are capable of directing the expression of genes to which they are operably linked.

As used herein, the term "polynucleotide" refers to a polymer of nucleosides. Typically, a polynucleotide is composed of nucleosides that are naturally found in DNA or RNA (e.g., adenosine, thymidine, guanosine, cytidine, uridine, deoxyadenosine, deoxythymidine, deoxyguanosine, and deoxycytidine) joined by phosphodiester bonds. The term encompasses molecules comprising nucleosides or nucleoside analogs containing chemically or biologically modified bases, modified backbones, etc., whether or not found in naturally occurring nucleic acids, and such molecules may be preferred for certain applications. Where this application refers to a polynucleotide it is understood that both DNA, RNA, and in each case both single- and double-stranded forms (and complements of each single-stranded molecule) are provided. "Polynucleotide sequence" as used herein can refer to the polynucleotide material itself and/or to the sequence information (i.e., the succession of letters used as abbreviations for bases) that biochemically characterizes a specific nucleic acid. A polynucleotide sequence presented herein is presented in a 5' to 3' direction unless otherwise indicated.

As used herein, the term "promoter" refers to a recognition site on DNA that is bound by an RNA polymerase. The polymerase drives transcription of the transgene.

"Percent (%) sequence identity" with respect to a reference polynucleotide or polypeptide sequence is defined as the percentage of nucleic acids or amino acids in a candidate sequence that are identical to the nucleic acids or amino acids in the reference polynucleotide or polypeptide sequence, after aligning the sequences and introducing gaps, if necessary, to achieve the maximum percent sequence identity. Alignment for purposes of determining percent nucleic acid or amino acid sequence identity can be achieved in various ways that are within the capabilities of one of skill in the art, for example, using publicly available computer software such as BLAST, BLAST-2, or Megalign software. Those skilled in the art can determine appropriate parameters for aligning sequences, including any algorithms needed to achieve maximal alignment over the full length of the sequences being compared. For example, percent sequence identity values may be generated using the sequence comparison computer program BLAST. As an illustration, the percent sequence identity of a given nucleic acid or amino acid sequence, A, to, with, or against a given nucleic acid or amino acid sequence, B, (which can alternatively be phrased as a given nucleic acid or amino acid sequence, A that has a certain percent sequence identity to, with, or against a given nucleic acid or amino acid sequence, B) is calculated as follows:

$$100 \text{ multiplied by (the fraction } X/Y)$$

where X is the number of nucleotides or amino acids scored as identical matches by a sequence alignment program (e.g., BLAST) in that program's alignment of A and B, and where Y is the total number of nucleic acids in B. It will be appreciated that where the length of nucleic acid or amino acid sequence A is not equal to the length of nucleic acid or amino acid sequence B, the percent sequence identity of A to B will not equal the percent sequence identity of B to A.

As used herein, the term "pharmaceutical composition" refers to a mixture containing a therapeutic agent, optionally in combination with one or more pharmaceutically acceptable excipients, diluents, and/or carriers, to be administered to a subject, such as a mammal, e.g., a human, in order to prevent, treat or control a particular disease or condition affecting or that may affect the subject.

As used herein, the term "pharmaceutically acceptable" refers to those compounds, materials, compositions and/or dosage forms, which are suitable for contact with the tissues of a subject, such as a mammal (e.g., a human) without excessive toxicity, irritation, allergic response and other problem complications commensurate with a reasonable benefit/risk ratio.

As used herein, the term "sample" refers to a specimen (e.g., blood, blood component (e.g., serum or plasma), urine, saliva, amniotic fluid, cerebrospinal fluid, tissue (e.g., placental or dermal), pancreatic fluid, chorionic villus sample, and cells) isolated from a subject.

As used herein, the term "transcription regulatory element" refers to a polynucleotide that controls, at least in part, the transcription of a gene of interest. Transcription regulatory elements may include promoters, enhancers, and other polynucleotides (e.g., polyadenylation signals) that control or help to control gene transcription. Examples of transcription regulatory elements are described, for example, in Lorence, Recombinant Gene Expression: Reviews and Protocols (Humana Press, New York, NY, 2012).

As used herein, the term "transfection" refers to any of a wide variety of techniques commonly used for the introduction of exogenous DNA into a prokaryotic or eukaryotic host cell, e.g., electroporation, lipofection, calcium phosphate precipitation, DEAE-dextran transfection, Nucleofection, squeeze-poration, sonoporation, optical transfection, magnetofection, impalefection and the like.

As used herein, the terms "subject" and "patient" refer to an animal (e.g., a mammal, such as a human). A subject to be treated according to the methods described herein may be one who has been diagnosed with hearing loss (e.g., sensorineural hearing loss) or one at risk of developing this condition. Diagnosis may be performed by any method or technique known in the art. One skilled in the art will understand that a subject to be treated according to the present disclosure may have been subjected to standard tests or may have been identified, without examination, as one at risk due to the presence of one or more risk factors associated with the disease or condition.

As used herein, the terms "transduction" and "transduce" refer to a method of introducing a vector construct or a part thereof into a cell. Wherein the vector construct is contained in a viral vector such as for example an AAV vector, transduction refers to viral infection of the cell and subsequent transfer and integration of the vector construct or part thereof into the cell genome.

As used herein, "treatment" and "treating" in reference to a disease or condition, refer to an approach for obtaining beneficial or desired results, e.g., clinical results. Beneficial or desired results can include, but are not limited to, alleviation or amelioration of one or more symptoms or conditions; diminishment of extent of disease or condition; stabilized (i.e., not worsening) state of disease, disorder, or condition; preventing spread of disease or condition; delay or slowing the progress of the disease or condition; amelioration or palliation of the disease or condition; and remission (whether partial or total), whether detectable or undetectable. "Ameliorating" or "palliating" a disease or condition means that the extent and/or undesirable clinical manifestations of the disease, disorder, or condition are lessened and/or time course of the progression is slowed or lengthened, as compared to the extent or time course in the absence of treatment. "Treatment" can also mean prolonging survival as compared to expected survival if not receiving treatment. Those in need of treatment include those already with the condition or disorder, as well as those prone to have the condition or disorder or those in which the condition or disorder is to be prevented.

As used herein, the term "vector" refers to a nucleic acid vector, e.g., a DNA vector, such as a plasmid, cosmid, or artificial chromosome, an RNA vector, a virus, or any other suitable replicon (e.g., viral vector). A variety of vectors have been developed for the delivery of polynucleotides encoding exogenous proteins into a prokaryotic or eukaryotic cell. Examples of such expression vectors are described in, e.g., Gellissen, Production of Recombinant Proteins: Novel Microbial and Eukaryotic Expression Systems (John Wiley & Sons, Marblehead, M A, 2006). Expression vectors suitable for use with the compositions and methods described herein contain a polynucleotide sequence as well as, e.g., additional sequence elements used for the expression of proteins and/or the integration of these polynucleotide sequences into the genome of a mammalian cell. Certain vectors that can be used for the expression of transgene as described herein include vectors that contain regulatory sequences, such as promoter and enhancer regions, which direct gene transcription. Other useful vectors for expression of a transgene contain polynucleotide sequences that enhance the rate of translation of the transgene or improve the stability or nuclear export of the mRNA that results from gene transcription. These sequence elements include, e.g., 5' and 3' untranslated regions and a polyadenylation signal site in order to direct efficient transcription of the gene carried on the expression vector. The expression vectors suitable for use with the compositions and methods described herein may also contain a polynucleotide encoding a marker for selection of cells that contain such a vector. Examples of a suitable marker include genes that encode resistance to antibiotics, such as ampicillin, chloramphenicol, kanamycin, or nourseothricin.

As used herein, the term "wild-type" refers to a genotype with the highest frequency for a particular gene in a given organism.

BRIEF DESCRIPTION OF THE DRAWINGS

FIGS. 2A-2G are a series of fluorescence images of mouse cochlear explants transduced with an adeno-associated virus (AAV) vector containing a human histone H2B gene fused to a green fluorescent protein (GFP) gene under control of a murine CABP2 promoter (SEQ ID NO: 1). Anti-Myosin 7a (MYO7A) antibody was used to label all hair cells and an anti-GFP antibody was used to label CABP2 promoter-mediated GFP expression. Transduction of cochlear hair cells in explants from postnatal day 1 B6/CAST-Cdh23Ahl+/Kjn mice resulted in inner hair cell (IHC)-specific GFP expression as seen at low magnification (FIG. 2A) and high magnification (FIGS. 2B-2C). In a separate experiment, cochlear explants were prepared from P4 C57BL/6NTac mouse pups. GFP expression was observed in cochlear IHCs as observed at low magnification (FIG. 2D and FIG. 2F) and high magnification (FIG. 2E and FIG. 2G).

DETAILED DESCRIPTION

Figure 1:
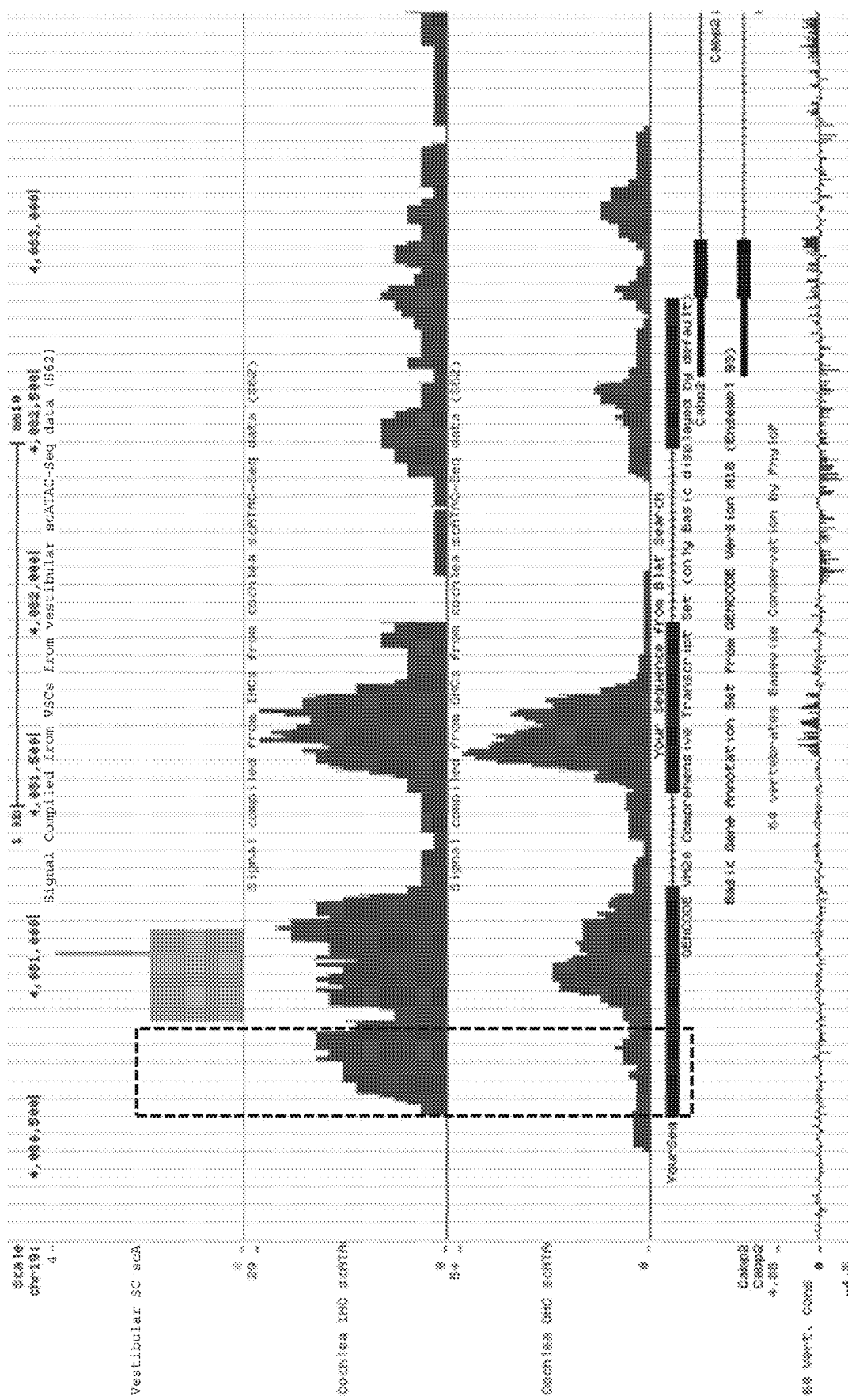
FIG. 1 is a genome map of murine chromosome 19 containing the Calcium Binding Protein 2 (CABP2) gene locus. Single cell (sc)-Assay for Transposase Accessible Chromatin (ATAC)-sequencing (seq) peaks were aligned to the CABP2 locus near the CABP2 translation start site (TSS). Regions near the CABP2 TSS contain annotated summits of sc-ATAC-seq peaks in hair cells of the cochlea and regions of high mammalian conservation (FIG. 1, black rectangles).

Described herein are compositions and methods for inducing transgene expression specifically in cochlear inner hair cells (IHCs). The invention features IHC-specific promoters that are capable of expressing a transgene specifically in IHCs of the inner ear. The invention also features nucleic acid vectors containing said promoters operably linked to polynucleotides encoding polypeptides. The compositions and methods described herein can be used to express polynucleotides encoding proteins (e.g., therapeutic proteins, reporter proteins, or other proteins of interest) specifically in IHCs, and, therefore, the compositions described herein can be administered to a subject (such as a mammalian subject, for instance, a human) to treat disorders caused by dysfunction of IHCs, such as hearing loss.

Hair Cells

Hair cells are sensory cells of the auditory and vestibular systems that reside in the inner ear. Cochlear hair cells are the sensory cells of the auditory system, and are made up of two main cell types: IHCs, which are responsible for sensing sound, and outer hair cells (OHCs), which are thought to amplify low-level sound. Hair cells are named for the stereocilia that protrude from the apical surface of the cell, forming a hair cell bundle. Deflection of the stereocilia (e.g., by sound waves in cochlear hair cells) leads to the opening of mechanically gated ion channels, which allows hair cells to release neurotransmitters to activate nerves, thereby converting mechanical sound signals into electrical signals that can be transmitted to the brain. Cochlear hair cells are essential for normal hearing, and damage to cochlear hair cells and genetic mutations that disrupt cochlear hair cell function are implicated in hearing loss and deafness. Gene therapy has recently emerged as an attractive therapeutic approach for treating hearing loss; however, the field lacks methods for specifically targeting the nucleic acid vectors used in gene therapy to hair cells.

The present invention is based, in part, on the discovery of genes that are specifically expressed in cochlear IHCs compared to other cochlear cell types. The promoters of these genes, therefore, can induce gene expression specifically in IHCs of the inner ear. The compositions and methods described herein can, thus, be used to express a gene of interest in IHCs such as, for example, a gene implicated in IHC development, IHC function, IHC fate specification, IHC regeneration, IHC survival, or IHC maintenance, or a gene known to be disrupted, e.g., mutated, in subjects with hearing loss, to treat subjects having or at risk of developing hearing loss (e.g., sensorineural hearing loss).

Calcium Binding Protein 2

Calcium Binding Protein 2 (CABP2) belongs to a subfamily of calcium binding proteins that share similarity to calmodulin. Like calmodulin, these family members can likely stimulate calmodulin-dependent kinase II and the protein phosphatase calcineurin. Calcium binding proteins are an important component of calcium mediated cellular signal transduction.

The present invention is based, in part, on the discovery that CABP2 transcript is expressed at much higher levels in IHCs compared to other cochlear cell types (e.g., outer hair cells), suggesting that CABP2 promoter sequences could be used to promote expression of a transgene specifically in IHCs. The compositions and methods described herein can, thus, be used to express a gene of interest in IHCs (e.g., a gene implicated in IHC development, function, cell fate specification, regeneration, survival, or maintenance, or a gene known to be disrupted, e.g., mutated, in subjects with hearing loss) to treat subjects having or at risk of developing hearing loss (e.g., sensorineural hearing loss).

The compositions and methods described herein include CABP2 promoters listed in Table 2 (e.g., any one of SEQ ID NOs: 1-3) that are capable of expressing a transgene specifically in IHCs, such as polynucleotide sequences that have at least 85% sequence identity (e.g., 85%, 86%, 87%, 88%, 89%, 90%, 91%, 92%, 93%, 94%, 95%, 96%, 97%, 98%, 99%, or more, sequence identity) to any one of SEQ ID NOs: 1-3. The polynucleotides described herein can include regions located both upstream and downstream of the translation start site (TSS) of the CABP2 gene or may include only upstream regions of the CABP2 gene.

Exemplary promoter sequences for CABP2 are listed in Table 2.

TABLE 2

CABP2 promoter sequences

| SEQ ID NO: | Description of promoter sequence | Promoter sequence |
|---|---|---|
| 1 | Murine CABP2 promoter sequence (1526 bp) | AACATGAGAGAATATGCTTTCTGGGCACTG TTTTTGAGGATGTCCCTGCCTGGTGCAGAT GGTCTGAAAAGCCACACGCTGGGTCCTGTG AACAATGACAAAGAACCCTTCCAACACTTG ACCGCCTGGCCAGAGTCCACACACCTCTCA GGCTTGCCTGTCCCAGATCTCAGTCTTCTT CACGCTGTGTTTAGCCTGTTCCCTCCTCAT GGAGGCCACCTACTCCCAGTGACCTTATCT CACCTCCACACACAGCAAGGCCTCCCTCTG AGAGGTAGCCTGTGGGACTGTCCTTGTATT TTCCCATTGACTATAGTCCTACATTGCTGA AGGTGCTGCCCCTACCACGTCAAAAGCTCT AGAGGTGAAGCTGACAGGCTGCTCCCAGGC CGAGGGTGACAGTGCCACCCTCTGGTGCCC TCTCTCTACTGTCTATACGTTCTACAGAGG CCACTGATGTTCTCCCCTTCCTCCCGAGGG CTCTGCCCAGTGTTACTTGAGAGTTCCCGG ACTCTGCCAGATCACTGTTGACTGTCAGCC TCATTCAGGGCTACTTGACATCAGCAGAAC AGGCCATGTCTCTAGTGTGCAGAGCCTTCC TCTCACCTGCCTGGGTGGGTATTCCGAAGC ACAACAGAGTCTTTCTGTATGCTAGGCAAG CACTCTACCAAGGGAGATATAGGCCCTGCC TCTCTCCCCACTCTCCCTCCCGTCCTTGAT GTTTGCAAGCTAGTCACTGAATCGATGATA GAGTCACTAGCTCAGATGGCAGACATGGCA TGGGATCTGGTTCCCTGGGACAAAGGCTGG TGCAGAGGGCATGTGAATAAATCATGAGGG GCCCACGACAGGCCAGCAGGCCACAGCTGA CCTCATTCTGGAAGTGAGAGTAAGCTGCTG TGTGGTGAGTGGCTGCAGTGTGGCAAGGGG CAAGGGTCTGTGTGGCACCTTTATTCTTGT TCCTTGAGAAGAGCTTACAGGTCAGGGGGG TGGTTCACCCAGGAGGTGGGGAAGCAGAGG TGGAAACAGAGGTATCCTGGGACTCCAGAT GGGGAAGAGAGGAGCAGGTGGCATACTTTT CCAGAATCTTGGAGCTGTCCTGGGAAAGAG AGGGTCCTGAGAGTACTGGTCTACCAAGAC ATAGCATAGGCCAAGCCAAAGCAGATGGAG AGCAAGCAGGATCGGAGCAGGAAGAATGT GTTAGGACCACGAACCAGAGAAGTGCAGGC AGGATATGGGACTGAAGGAGGCCAGCCAGC GTGGGAGCCTGGCCACCTGGATCAGCGAGG AGCCCCAGGGTGGAGTCTGTGGTCCTGTGA AGGTTGGGAAGCACTCTAGGAGGTAGGTGA AGATTTCAAAGATGGATTATGGGAGCAGCA ATGGAAGAAGACAGTGACCTTAGAGGACTC GGGCTCTTCTAACCCCCAGAGCTAGAAACA AAAACATAGCCACAGCTTGCACTGAGCCAC CGACCTACAGGTGGAGGAGACCCAGCTGGA ACAGAAAACGTACCACACCTACATCC |
| 2 | Human CABP2 promoter sequence 1 | TCTGGGAGTTGAAGAGCGGGCAGCTGGGTG GGGAGTGGGCTGGGGTCATGGCAAGGAAGC CTGAGAGGCCAGCAGGGGCTGCCCGGCCCA CCTCCACCCCTTTTCCTTGAGAAGCAAGAG GTTGAAGGTCAGCAGGACCAGGTGGAGGTC CTGGCAGAACGCAGGGAGGTGGGCAATGCA GAGGGACCCTGGGGAGGAGAGGGGGCTAGC |

TABLE 2-continued

CABP2 promoter sequences

| SEQ ID NO: | Description of promoter sequence | Promoter sequence |
|---|---|---|
| | | ACAGAGGGACCCTGGGGAGGAGGGAGGGAA GGAGGGGGCTAGCACAGAGGGACCCTGGGG AGGAGGGAGGGAAGGAGGGGGCAGCACAGA GGGACCCTGGGGAGGAGGGAGGGAGGCAGG GAGGTGGGCAGCACAGACGGACCCTAGGGC TCTGGGCTGGGGAGATGGGGAAGGCCTTTC CAGAATTCTGGAGCTCTCCTGGGAGCGGGA TGGTGGGGAGAATAGGAAGAGCAAGGAAGG ACAGACAGAAAGACCAATGCAAGAAAGGAC CTTGCAGCAACAGAGGGAAGGAGCCAGCAG AGAGATGGGCTGAGTGGGTCAGGACGGCA GAGACACCACTGGATCCAGACTGACAGAGA TGGCGCGAGTCAGAGGGGATGGAGACGGG GCTGCAGGCAAAACAGACACAGAGGCAGAG GGGGCACAGAGGGGCGGGCGGTGAGATGGA AACTGAGCAAGGAGGTGTGTGGGGCATCAG GTGCGCGTGAGCCAGAGAGATGCAGGCAGA ACACTGCGGGGAGGAGGCCAAAGGCAGGC AGGAGGGCCGACCACTGGGGCCACAAGGAT GATCAGGTGGAGCCCCGGGCACAGTCTGTG ACCAGCATGAGGGGCTTCACCAGGCTGACA GGGCCACACGAGGGGCCACGGGGAGCTAGG GAGGATACAAGACTCTGGGGACACGGGGCT CTCCCAGTTTATGGAGGAAGGGACAGAAAG AAGAGTAGCAGGGACCCAGGCCACACCTGT GGCTGCCCACAAGACCACTCTCCCGCAGGA CTGGGGAGGCCGGACGGAGCAGCGTCCCTC AGCCAGGAGGAGGTACCAAGCCCTCATCTC CATGGCCCAGCCCCAGGGCCCAGCAGAGGG CAGCCTCCCAACGGGGGACCCCAGCCCCTC TGAGGGCACTCCAGGAACCAGCCAGGCCCC TGGCAGCCCAGCAGCCACCCGGCGACGAGA GCTTCTCCGGGAGCTCGAGGCCCAGGTGCA GGCAGCCTACGGGCAGGTAATGCGGGCAGG GGTATGAGGGGACCAGGAACAAAGAGCAGG GACCCCACACCCCAACTGGGGGCCCCGGAG GACAGACCCAGGACTTAGTCCAGGGAGGGG ACCAGGAGGCAGAGTCCAATGGGAGACTCT CTGAGGTCGGCAGGGCCGGGGTGGCTTCCC TTCCCAATCTCCACCCTCACCGAGCCCTGT CACTGCCCACAGCACATAGGCGGTTCCCTT CTGCTCCTCATCCAAGGGCGGGCACCAGT CCAGGCAGGGGGAGCCAAGTGCAAGCAATT GGGGCTACCCCGAGGTGAGGAGCCCAGGGC CCAGCTGGGGTCCTGGCAGGGAGAGGCAGG GGCTTCCTGGGCTGAGCCAAGTGGCTGCCT CTTTCTGGGAGGCTGTGTGGGAAGGCCCGC GTGTCCATACCAACCGGAATCTGTGCCATT CGGAGGGCCCAGCCCACCCTGGCACACTGC ACGCCTGCCTTCCTCCTCCTGGGACCCAGG CCCTGCTTCTGAAGACATTAAATCTCCCCT GATTGGGAGAGATTAGAGGCAGGGGTTGGG GGAGGGTGCTGGAGAAGGGGCGTCTGGAAG ACCCTCAGGAGGCAGTCTGGGGAGGCTGTG CTCTCCAGGGGGCCTTGGGCCCAAGTGGCT CCCCTCAGCAGCGGAGACGCTCAAAGATAA TCCCGGATTAGGACCCAAGCCCCAGGCCCA AGTCCCCCGCCTGCCCACCCGCCCCCGATC TTCCCCACAAAACCCCAGGAAAATCCCCGG CAGTACTCCCAGGCTCTCATCGGGAGCAGC TGGGGGCTGGCAGGAGTCCTCAGGCAGCAG CATCCGCCGAGGCCCACCCGGGCCACCCCC GGGGTTCCAGGCCTGGCATGGTTCAGGGCC CATGGGAACTGTGCCAAGCGGCCCTGGCG CCGGGGCCCTAAGGTAGGAGGGGTCAGGGG AGAAACCCAGGCCAGGAGGCTGGAATGGAC CCTGAGGGTCAGATGGGATGGGCAGAGCCC TCCGAGGGCCGGGCGGGGTTGGGGGCTGCC CACTGCCCCAGGTGGAGATTTTTTTCCTGG AAGCCACAGCCTCTGGCCATCCTGATCTTG GCTCCCACCGACCTCTGGGTCTCCCCTGCC AGGCTCCAGGTCCCCCAGCTGCCCGTCCAG CTGCCCCATCCCGGCTGCAGGTCCCCGCTC TCTGCTAGCCAGCCTCCATCTAGGAGACAG |
| | | AGCTGGGCACAAGGTCCCTCTCTGCCGCTG GCTTTCTCAGTGGCCTTGGCCAAGTCTCTT GCCTTTTCTG |
| 3 | Human CABP2 promoter sequence 2 | ACAGATGAATAAATCATGAGGGGCCTGGAA TGGAGCCGGGGCAGGATGATGACCTCATTC TGGGAGTTGAAGAGCGGGCAGCTGGGTGGG GAGTGGGCTGGGGTCATGGCAAGGGACAGA AAGAAGAGTAGCAGGGACCCAGGCCACACC TGTGGCTGCCCACAAGACCACTCTCCCGCA GGACTGGGGAGGCCGGACGGAGCAGCGTCC CTCAGCCAGGAGGAGGTACCAAGCCCTCAT CTCCATGGCCCAGCCCCAGGGCCCAGCAGA GGGCAGCCTCCCAACGGGGGACCCCAGCCC CTCTGAGGGCACTCCAGGAACCAGCCAGGC CCCTGGCAGCCCAGCAGCCACCCGGCGACG AGAGCTTCTCCGGGAGCTCGAGGCCCAGGT GCAGGCAGCCTACGGGCAGGTAATGCGGGC AGGGGTATGAGGGGACCAGGAACAAAGAGC AGGGACCCCACACCCAGATTAGAGGCAGGGG TTGGGGGAGGGTGCTGGAGAAGGGGCGTCT GGAAGACCCTCAGGAGGCAGTCTGGGGAGG CTGTGCTCTCCAGGGGGCCTTGGGCCCAAG TGGCTCCCCTCAGCAGCGGAGACGCTCAAA GATAATCCCGGATTAGGACCCAAGCCCCAG GCCCAAGTCCCCCGCCTGCCCACCCGCCCC CGATCTTCCCCACAAAACCCCAGGAAAATC CCCGGCAGTACTCCCAGGCTCTCATCGGGA GCAGCTGGGGCTGGCAGGAGTCGGCAGCA GCATCCGCCGAGGCCCACCCGGGCCACCCC CGGGGTTCCAGGCCTGGCATGGTTCAGGGC CCATGGGAACTGTGCCAAGCGGCCCTGGC GCCGGGGCCCTAAGGTAGGAGGGGTCAGGG GAGAAACCCAGGCCAGGAGGCTGGAATGGA CCCTGAGGGT |

The foregoing polynucleotides can be included in a nucleic acid vector and operably linked to a transgene to express the transgene specifically in IHCs. In some embodiments, the transgene encodes a protein that is implicated in IHC function, IHC development, IHC fate specification, IHC regeneration, IHC survival, or IHC maintenance, or the transgene is the wild-type version of a gene that has been found to be mutated in subjects having hearing loss, deafness, auditory neuropathy, or tinnitus. According to the methods described herein, a subject can be administered a composition containing one or more of the foregoing polynucleotides (e.g., an IHC-specific promoter, e.g., any one the polynucleotide sequences listed in Table 2 (e.g., SEQ ID NOs: 1-3)) operably linked to a transgene encoding a therapeutic protein for the treatment of hearing loss, deafness, auditory neuropathy, or tinnitus. In some embodiments, the transgene encodes a protein selected from the group including Actin Gamma 1 (ACTG1), Fascin Actin-Bundling Protein 2, Retinal (FSCN2), Radixin (RDX), POU Class 4 Homeobox 3 (POU4F3), TRIO and F-Actin Binding Protein (TRIOBP), Taperin (TPRN), Xin Actin Binding Repeat Containing 2 (XIRP2), Atonal BHLH Transcription Factor 1 (ATOH1), Growth Factor Independent 1 Transcriptional Repressor (GF11), Cholinergic Receptor Nicotinic Alpha 9 Subunit (CHRNA9), Cholinergic Receptor Nicotinic Alpha 10 Subunit (CHRNA10), Calcium and Integrin Binding Family Member 3 (CIB3), Cadherin 23 (CDH23), Protocadherin 15 (PCDH15), Kinocilin (KNCN), Pejvakin (DFNB59), Otoferlin (OTOF), MKRN2 Opposite Strand (MKRN2OS), LIM Homeobox Protein 3 (LHX3), Transmembrane Channel Like 1 (TMC1), Myosin 15 (MYO15), Myosin 7A (MYO7A), Myosin 6 (MYO6), Myosin IIIA (MYO3A), Myosin IIIB (MYO3B), Glutaredoxin Domain Containing Cysteine-Rich Protein 1 (GRXCR1), Protein Tyrosine Phosphatase, Receptor Type Q (PTPRQ), Late Cornified Envelope 6A (LCE6A), Lipoxygenase Homology Domain-containing Protein 1 (LOXHD1), ADP-Ribosyltransferase 1 (ART1), ATPase Plasma Membrane Ca2+ Transporting 2 (ATP2B2), Calcium and Integrin Binding Family Member 2 (CIB2), Calcium Voltage-Gated Channel Auxiliary Subunit Alpha2delta 4 (CACNA2D4), Calcium Binding Protein 2 (CABP2), Epidermal Growth Factor Receptor Pathway Substrate 8 (EPS8), EPS8 Like 2 (EPS8L2), Espin (ESPN), Espin Like (ESPNL), Peripherin 2 (PRPH2), Stereocilin (STRC), Solute Carrier Family 8 Member A2 (SLC8A2), Zinc Finger CCHC-Type Containing Protein 12 (ZCCHC12), Leucine Rich Transmembrane and O-methyltransferase Domain Containing (LRTOMT2, LRTOMT1), USH1 Protein Network Component Harmonin (USH1C), Extracellular Leucine Rich Repeat and Fibronectin Type III Domain Containing 1 (ELFN1), Tetratricopeptide Repeat Protein 24 (TTC24), Dystrotelin (DYTN), Kielin/Chordin-Like Protein (KCP), Coiled-coil Glutamate Rich Protein 2 (CCER2), Leucine-rich Repeat and Transmembrane Domain-containing protein 2 (LRTM2), Potassium Voltage-Gated Channel Subfamily A Member 10 (KCNA10), Neurotrophin 3 (NTF3), Clarin 1 (CLRN1), Clarin 2 (CLRN2), SKI Family Transcriptional Corepressor 1 (SKOR1), Tctex1 Domain Containing Protein 1 (TCTEX1 D1), Fc Receptor Like B (FCRLB), Solute Carrier Family 17 Member 8 (SLC17A8), Glutaredoxin Domain Containing Cysteine-Rich Protein 2 (GRXCR2), Brain-derived Neurotrophic Factor (BDNF), Serpin Family E Member 3 (SERPINE3), Nescient Helix-loop Helix 1 (NHLH1), Heat Shock Protein 70 (HSP70), Heat Shock Protein 90 (HSP90), Activating Transcription Factor 6 (ATF6), Eukaryotic Translation Initiation Factor 2 Alpha Kinase 3 (PERK), Serine/Threonine-Protein Kinase/Endoribonuclease IRE1 (IRE1), Whirlin (WHRN), Oncomodulin (OCM), LIM Homeobox 1 (Isl1), Transmembrane and Tetratricopeptide Repeat Containing 4 (TMTC4), and Binding Immunoglobulin Protein (BIP).

Expression of Exogenous Polynucleotides in Mammalian Cells

Mutations in a variety of genes, such as MYO7A, POU4F3, SLC17A8, and TMC1, have been linked to sensorineural hearing loss. The compositions and methods described herein can be used to induce or increase the expression of proteins encoded by genes of interest (e.g., the wild-type form of genes implicated in hearing loss, or genes involved in IHC development, IHC function, IHC fate specification, IHC regeneration, IHC survival, or IHC maintenance) specifically in, e.g., IHCs by administering a nucleic acid vector that contains an IHC-specific promoter sequence (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)) operably linked to a polynucleotide sequence that encodes a protein of interest. A wide array of methods has been established for the delivery of proteins to mammalian cells and for the stable expression of genes encoding proteins in mammalian cells.

Proteins that can be expressed in connection with the compositions described herein (e.g., when the transgene encoding the protein is operably linked to an IHC-specific promoter (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3))) are proteins that are expressed in healthy IHCs (e.g., proteins that play a role in IHC development, IHC function, IHC regeneration, IHC fate specification, IHC survival, or IHC maintenance, or proteins that are deficient in subjects with sensorineural hearing loss) or other proteins of interest. Proteins that can be expressed in hair cells using the compositions and methods described herein include ACTG1, FSCN2, RDX, POU4F3, TRIOBP, TPRN, XIRP2, ATOH1, GF11, CHRNA9, CHRNA10, CIB3, CDH23, PCDH15, KNCN, DFNB59, OTOF, MKRN2OS, LHX3, TMC1, MYO15, MYO7A, MYO6, MYO3A, MYO3B, GRXCR1, PTPRQ, LCE6A, LOXHD1, ART1, ATP2B2, CIB2, CACNA2D4, CABP2, EPS8, EPS8L2, ESPN, ESPNL, PRPH2, STRC, SLC8A2, ZCCHC12, LRTOMT2, LRTOMT1, USH1C, ELFN1, TTC24, DYTN, KCP, CCER2, LRTM2, KCNA10, CLRN1, CLRN2, SKOR1, TCTEX1D1, FCRLB, SLC17A8, GRXCR2, BDNF, SERPINE3, NHLH1, HSP70, HSP90, ATF6, PERK, IRE1, WHRN, OCM, ISL1, NTF3, TMTC4, and BIP. The polynucleotides (e.g., IHC-specific promoters) described herein can also be used to express a short interfering RNA (siRNA), an antisense oligonucleotide (ASO), a nuclease (e.g., CRISPR Associated Protein 9 (Cas9), Transcription Activator-Like Effector Nuclease (TALEN), Zinc Finger Nuclease (ZFN), or guide RNA (gRNA)), or a microRNA in IHCs.

Polynucleotides Encoding Proteins of Interest

One platform that can be used to achieve therapeutically effective intracellular concentrations of proteins of interest in mammalian cells is via the stable expression of the gene encoding the protein of interest (e.g., by integration into the nuclear or mitochondrial genome of a mammalian cell, or by episomal concatemer formation in the nucleus of a mammalian cell). The gene is a polynucleotide that encodes the primary amino acid sequence of the corresponding protein. In order to introduce exogenous genes into a mammalian cell, genes can be incorporated into a vector. Vectors can be introduced into a cell by a variety of methods, including transformation, transfection, transduction, direct uptake, projectile bombardment, and by encapsulation of the vector in a liposomes. Examples of suitable methods of transfecting or transforming cells include calcium phosphate precipitation, electroporation, microinjection, infection, lipofection and direct uptake. Such methods are described in more detail, for example, in Green, et al., Molecular Cloning: A Laboratory Manual, Fourth Edition (Cold Spring Harbor University Press, New York 2014); and Ausubel, et al., Current Protocols in Molecular Biology (John Wiley & Sons, New York 2015), the disclosures of each of which are incorporated herein by reference.

Proteins of interest can also be introduced into a mammalian cell by targeting a vector containing a gene encoding a protein of interest to cell membrane phospholipids. For example, vectors can be targeted to the phospholipids on the extracellular surface of the cell membrane by linking the vector molecule to a VSV-G protein, a viral protein with affinity for all cell membrane phospholipids. Such a construct can be produced using methods well known to those of skill in the field.

Recognition and binding of the polynucleotide encoding a protein of interest by mammalian RNA polymerase is important for gene expression. As such, one may include sequence elements within the polynucleotide that exhibit a high affinity for transcription factors that recruit RNA polymerase and promote the assembly of the transcription complex at the transcription initiation site. Such sequence elements include, e.g., a mammalian promoter, the sequence of which can be recognized and bound by specific transcription initiation factors and ultimately RNA polymerase. Examples of mammalian promoters have been described in Smith, et al., Mol. Sys. Biol., 3:73, online publication, the disclosure of which is incorporated herein by reference. The promoter used in the methods and compositions described herein is an IHC-specific promoter (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)).

Once a polynucleotide encoding a protein of interest has been incorporated into the nuclear DNA of a mammalian cell, the transcription of this polynucleotide can be induced by methods known in the art. For example, expression can be induced by exposing the mammalian cell to an external chemical reagent, such as an agent that modulates the binding of a transcription factor and/or RNA polymerase to the mammalian promoter and thus regulates gene expression. The chemical reagent can serve to facilitate the binding of RNA polymerase and/or transcription factors to the mammalian promoter, e.g., by removing a repressor protein that has bound the promoter. Alternatively, the chemical reagent can serve to enhance the affinity of the mammalian promoter for RNA polymerase and/or transcription factors such that the rate of transcription of the gene located downstream of the promoter is increased in the presence of the chemical reagent. Examples of chemical reagents that potentiate polynucleotide transcription by the above mechanisms include tetracycline and doxycycline. These reagents are commercially available (Life Technologies, Carlsbad, CA) and can be administered to a mammalian cell in order to promote gene expression according to established protocols.

Other DNA sequence elements that may be included in polynucleotides for use in the compositions and methods described herein include enhancer sequences. Enhancers represent another class of regulatory elements that induce a conformational change in the polynucleotide containing the gene of interest such that the DNA adopts a three-dimensional orientation that is favorable for binding of transcription factors and RNA polymerase at the transcription initiation site. Thus, polynucleotides for use in the compositions and methods described herein include those that encode a protein of interest and additionally include a mammalian enhancer sequence. Many enhancer sequences are now known from mammalian genes, and examples include enhancers from the genes that encode mammalian globin, elastase, albumin, α-fetoprotein, and insulin. Enhancers for use in the compositions and methods described herein also include those that are derived from the genetic material of a virus capable of infecting a eukaryotic cell. Examples include the SV40 enhancer on the late side of the replication origin (bp 100-270), the cytomegalovirus early promoter enhancer, the polyoma enhancer on the late side of the replication origin, and adenovirus enhancers. Additional enhancer sequences that induce activation of eukaryotic gene transcription include the CMV enhancer and RSV enhancer. An enhancer may be spliced into a vector containing a polynucleotide encoding a protein of interest, for example, at a position 5' or 3' to this gene. In a preferred orientation, the enhancer is positioned at the 5' side of the promoter, which in turn is located 5' relative to the polynucleotide encoding a protein of interest.

The nucleic acid vectors containing an IHC-specific promoter described herein may include a Woodchuck Posttranscriptional Regulatory Element (WPRE). The WPRE acts at the mRNA level, by promoting nuclear export of transcripts and/or by increasing the efficiency of polyadenylation of the nascent transcript, thus increasing the total amount of mRNA in the cell. The addition of the WPRE to a vector can result in a substantial improvement in the level of transgene expression from several different promoters, both in vitro and in vivo.

In some embodiments, the nucleic acid vectors containing an IHC-specific promoter described herein include a reporter sequence, which can be useful in verifying the expression of a gene operably linked to an IHC-specific promoter, for example, in cells and tissues (e.g., in IHCs). Reporter sequences that may be provided in a transgene include DNA sequences encoding β-lactamase, β-galactosidase (LacZ), alkaline phosphatase, thymidine kinase, green fluorescent protein (GFP), chloramphenicol acetyltransferase (CAT), luciferase, and others well known in the art. When associated with regulatory elements that drive their expression, such as an IHC-specific promoter, the reporter sequences provide signals detectable by conventional means, including enzymatic, radiographic, colorimetric, fluorescence or other spectrographic assays, fluorescent activating cell sorting assays and immunological assays, including enzyme linked immunosorbent assay (ELISA), radioimmunoassay (RIA), and immunohistochemistry. For example, where the marker sequence is the LacZ gene, the presence of the vector carrying the signal is detected by assays for β-galactosidase activity. Where the transgene is green fluorescent protein or luciferase, the vector carrying the signal may be measured visually by color or light production in a luminometer.

Methods for the Delivery of Exogenous Polynucleotides to Target Cells

Techniques that can be used to introduce a transgene, such as a transgene operably linked to an IHC-specific promoter described herein, into a target cell (e.g., a mammalian cell) are well known in the art. For instance, electroporation can be used to permeabilize mammalian cells (e.g., human target cells) by the application of an electrostatic potential to the cell of interest. Mammalian cells, such as human cells, subjected to an external electric field in this manner are subsequently predisposed to the uptake of exogenous polynucleotides. Electroporation of mammalian cells is described in detail, e.g., in Chu et al., Nucleic Acids Research 15:1311 (1987), the disclosure of which is incorporated herein by reference. A similar technique, Nucleofection™, utilizes an applied electric field in order to stimulate the uptake of exogenous polynucleotides into the nucleus of a eukaryotic cell. Nucleofection™ and protocols useful for performing this technique are described in detail, e.g., in Distler et al., Experimental Dermatology 14:315 (2005), as well as in US 2010/0317114, the disclosures of each of which are incorporated herein by reference.

Additional techniques useful for the transfection of target cells include the squeeze-poration methodology. This technique induces the rapid mechanical deformation of cells in order to stimulate the uptake of exogenous DNA through membranous pores that form in response to the applied stress. This technology is advantageous in that a vector is not required for delivery of polynucleotides into a cell, such as a human target cell. Squeeze-poration is described in detail, e.g., in Sharei et al., Journal of Visualized Experiments 81:e50980 (2013), the disclosure of which is incorporated herein by reference.

Lipofection represents another technique useful for transfection of target cells. This method involves the loading of polynucleotides into a liposome, which often presents cationic functional groups, such as quaternary or protonated amines, towards the liposome exterior. This promotes electrostatic interactions between the liposome and a cell due to the anionic nature of the cell membrane, which ultimately leads to uptake of the exogenous polynucleotides, for instance, by direct fusion of the liposome with the cell membrane or by endocytosis of the complex. Lipofection is described in detail, for instance, in U.S. Pat. No. 7,442,386, the disclosure of which is incorporated herein by reference. Similar techniques that exploit ionic interactions with the cell membrane to provoke the uptake of foreign polynucleotides include contacting a cell with a cationic polymer-polynucleotide complex. Exemplary cationic molecules that associate with polynucleotides so as to impart a positive charge favorable for interaction with the cell membrane include activated dendrimers (described, e.g., in Dennig, Topics in Current Chemistry 228:227 (2003), the disclosure of which is incorporated herein by reference) polyethylenimine, and diethylaminoethyl (DEAE)-dextran, the use of which as a transfection agent is described in detail, for instance, in Gulick et al., Current Protocols in Molecular Biology 40:1:9.2:9.2.1 (1997), the disclosure of which is incorporated herein by reference. Magnetic beads are another tool that can be used to transfect target cells in a mild and efficient manner, as this methodology utilizes an applied magnetic field in order to direct the uptake of polynucleotides. This technology is described in detail, for instance, in US 2010/0227406, the disclosure of which is incorporated herein by reference.

Another useful tool for inducing the uptake of exogenous polynucleotides by target cells is laserfection, also called optical transfection, a technique that involves exposing a cell to electromagnetic radiation of a particular wavelength in order to gently permeabilize the cells and allow polynucleotides to penetrate the cell membrane. The bioactivity of this technique is similar to, and in some cases found superior to, electroporation.

Impalefection is another technique that can be used to deliver genetic material to target cells. It relies on the use of nanomaterials, such as carbon nanofibers, carbon nanotubes, and nanowires. Needle-like nanostructures are synthesized perpendicular to the surface of a substrate. DNA containing the gene, intended for intracellular delivery, is attached to the nanostructure surface. A chip with arrays of these needles is then pressed against cells or tissue. Cells that are impaled by nanostructures can express the delivered gene(s). An example of this technique is described in Shalek et al., PNAS 107: 1870 (2010), the disclosure of which is incorporated herein by reference.

Magnetofection can also be used to deliver polynucleotides to target cells. The magnetofection principle is to associate polynucleotides with cationic magnetic nanoparticles. The magnetic nanoparticles are made of iron oxide, which is fully biodegradable, and coated with specific cationic proprietary molecules varying upon the applications. Their association with the gene vectors (DNA, siRNA, viral vector, etc.) is achieved by salt-induced colloidal aggregation and electrostatic interaction. The magnetic particles are then concentrated on the target cells by the influence of an external magnetic field generated by magnets. This technique is described in detail in Scherer et al., Gene Therapy 9:102 (2002), the disclosure of which is incorporated herein by reference.

Another useful tool for inducing the uptake of exogenous polynucleotides by target cells is sonoporation, a technique that involves the use of sound (typically ultrasonic frequencies) for modifying the permeability of the cell plasma membrane to permeabilize the cells and allow polynucleotides to penetrate the cell membrane. This technique is described in detail, e.g., in Rhodes et al., Methods in Cell Biology 82:309 (2007), the disclosure of which is incorporated herein by reference.

Microvesicles represent another potential vehicle that can be used to modify the genome of a target cell according to the methods described herein. For instance, microvesicles that have been induced by the co-overexpression of the glycoprotein VSV-G with, e.g., a genome-modifying protein, such as a nuclease, can be used to efficiently deliver proteins into a cell that subsequently catalyze the site-specific cleavage of an endogenous polynucleotide sequence so as to prepare the genome of the cell for the covalent incorporation of a polynucleotide of interest, such as a gene or regulatory sequence. The use of such vesicles, also referred to as Gesicles, for the genetic modification of eukaryotic cells is described in detail, e.g., in Quinn et al., Genetic Modification of Target Cells by Direct Delivery of Active Protein [abstract]. In: Methylation changes in early embryonic genes in cancer [abstract], in: Proceedings of the 18th Annual Meeting of the American Society of Gene and Cell Therapy; 2015 May 13, Abstract No. 122.

Vectors for Delivery of Exogenous Polynucleotides to Target Cells

In addition to achieving high rates of transcription and translation, stable expression of an exogenous gene in a mammalian cell can be achieved by integration of the polynucleotide containing the gene into the nuclear genome of the mammalian cell. A variety of vectors for the delivery and integration of polynucleotides encoding exogenous proteins into the nuclear DNA of a mammalian cell have been developed. Examples of expression vectors are described in, e.g., Gellissen, Production of Recombinant Proteins: Novel Microbial and Eukaryotic Expression Systems (John Wiley & Sons, Marblehead, M A, 2006). Expression vectors for use in the compositions and methods described herein contain an IHC-specific promoter (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)) operably linked to a polynucleotide sequence that encodes a protein of interest, as well as, e.g., additional sequence elements used for the expression of these agents and/or the integration of these polynucleotide sequences into the genome of a mammalian cell. Vectors that can contain a hair cell-specific promoter operably linked to a transgene encoding a protein of interest include plasmids (e.g., circular DNA molecules that can autonomously replicate inside a cell), cosmids (e.g., pWE or sCos vectors), artificial chromosomes (e.g., a human artificial chromosome (HAC), a yeast artificial chromosome (YAC), a bacterial artificial chromosome (BAC), or a P1-derived artificial chromosome (PAC)), and viral vectors. Certain vectors that can be used for the expression of a protein of interest include plasmids that contain regulatory sequences, such as enhancer regions, which direct gene transcription. Other useful vectors for expression of a protein of interest contain polynucleotide sequences that enhance the rate of translation of these genes or improve the stability or nuclear export of the mRNA that results from gene transcription. These sequence elements include, e.g., 5' and 3' untranslated regions, an internal ribosomal entry site (IRES), and polyadenylation signal site in order to direct efficient transcription of the gene carried on the expression vector. The expression vectors suitable for use with the compositions and methods described herein may also contain a polynucleotide encoding a marker for selection of cells that contain such a vector. Examples of a suitable marker include genes that encode resistance to antibiotics, such as ampicillin, chloramphenicol, kanamycin, or nourseothricin.

Viral Vectors for Polynucleotide Delivery

Viral genomes provide a rich source of vectors that can be used for the efficient delivery of a gene of interest into the genome of a target cell (e.g., a mammalian cell, such as a human cell). Viral genomes are particularly useful vectors for gene delivery because the polynucleotides contained within such genomes are typically incorporated into the nuclear genome of a mammalian cell by generalized or specialized transduction. These processes occur as part of the natural viral replication cycle, and do not require added proteins or reagents in order to induce gene integration. Examples of viral vectors include a retrovirus (e.g., Retroviridae family viral vector), adenovirus (e.g., Ad5, Ad26, Ad34, Ad35, and Ad48), parvovirus (e.g., adeno-associated viruses), coronavirus, negative strand RNA viruses such as orthomyxovirus (e.g., influenza virus), rhabdovirus (e.g., rabies and vesicular stomatitis virus), paramyxovirus (e.g. measles and Sendai), positive strand RNA viruses, such as picornavirus and alphavirus, and double stranded DNA viruses including adenovirus, herpesvirus (e.g., Herpes Simplex virus types 1 and 2, Epstein-Barr virus, cytomegalovirus), and poxvirus (e.g., vaccinia, modified vaccinia Ankara (MVA), fowlpox and canarypox). Other viruses include Norwalk virus, togavirus, flavivirus, reoviruses, papovavirus, hepadnavirus, human papilloma virus, human foamy virus, and hepatitis virus, for example. Examples of retroviruses include: avian leukosis-sarcoma, avian C-type viruses, mammalian C-type, B-type viruses, D-type viruses, oncoretroviruses, HTLV-BLV group, lentivirus, alpharetrovirus, gammaretrovirus, spumavirus (Coffin, J. M., Retroviridae: The viruses and their replication, Virology, Third Edition (Lippincott-Raven, Philadelphia, 1996)). Other examples include murine leukemia viruses, murine sarcoma viruses, mouse mammary tumor virus, bovine leukemia virus, feline leukemia virus, feline sarcoma virus, avian leukemia virus, human T-cell leukemia virus, baboon endogenous virus, Gibbon ape leukemia virus, Mason Pfizer monkey virus, simian immunodeficiency virus, simian sarcoma virus, Rous sarcoma virus and lentiviruses. Other examples of vectors are described, for example, U.S. Pat. No. 5,801,030, the disclosure of which is incorporated herein by reference as it pertains to viral vectors for use in gene therapy.

AAV Vectors for Polynucleotide Delivery

In some embodiments, polynucleotides of the compositions and methods described herein are incorporated into rAAV vectors and/or virions in order to facilitate their introduction into a cell. rAAV vectors useful in the compositions and methods described herein are recombinant polynucleotide constructs that include (1) an IHC-specific promoter described herein (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)), (2) a heterologous sequence to be expressed, and (3) viral sequences that facilitate integration and expression of the heterologous genes. The viral sequences may include those sequences of AAV that are required in cis for replication and packaging (e.g., functional ITRs) of the DNA into a virion. In typical applications, the transgene encodes a protein that can promote hair cell development, hair cell function, hair cell regeneration, hair cell fate specification, hair cell survival, or hair cell maintenance, or a wild-type form of a hair cell protein that is mutated in subjects with forms of hereditary hearing loss that may be useful for improving hearing in subjects carrying mutations that have been associated with hearing loss or deafness. Such rAAV vectors may also contain marker or reporter genes. Useful rAAV vectors have one or more of the AAV WT genes deleted in whole or in part, but retain functional flanking ITR sequences. The AAV ITRs may be of any serotype suitable for a particular application. For use in the methods and compositions described herein, the ITRs can be AAV2 ITRs. Methods for using rAAV vectors are described, for example, in Tal et al., J. Biomed. Sci. 7:279 (2000), and Monahan and Samulski, Gene Delivery 7:24 (2000), the disclosures of each of which are incorporated herein by reference as they pertain to AAV vectors for gene delivery.

The polynucleotides and vectors described herein (e.g., an IHC-specific promoter operably linked to a transgene encoding a protein of interest) can be incorporated into a rAAV virion in order to facilitate introduction of the polynucleotide or vector into a cell. The capsid proteins of AAV compose the exterior, non-nucleic acid portion of the virion and are encoded by the AAV cap gene. The cap gene encodes three viral coat proteins, VP1, VP2 and VP3, which are required for virion assembly. The construction of rAAV virions has been described, for instance, in U.S. Pat. Nos. 5,173,414; 5,139,941; 5,863,541; 5,869,305; 6,057,152; and 6,376,237; as well as in Rabinowitz et al., J. Virol. 76:791 (2002) and Bowles et al., J. Virol. 77:423 (2003), the disclosures of each of which are incorporated herein by reference as they pertain to AAV vectors for gene delivery.

rAAV virions useful in conjunction with the compositions and methods described herein include those derived from a variety of AAV serotypes including AAV 1, 2, 3, 4, 5, 6, 7, 8, 9, 10, rh10, rh39, rh43, rh74, Anc80, Anc80L65, DJ/8, DJ/9, 7m8, PHP.B, PHP.eb, and PHP.S. For targeting hair cells, AAV1, AAV2, AAV2quad(Y-F), AAV6, AAV8, AAV9, Anc80, Anc80L65, DJ/9, 7m8, and PHP.B may be particularly useful. Serotypes evolved for transduction of the retina may also be used in the methods and compositions described herein. Construction and use of AAV vectors and AAV proteins of different serotypes are described, for instance, in Chao et al., Mol. Ther. 2:619 (2000); Davidson et al., Proc. Natl. Acad. Sci. USA 97:3428 (2000); Xiao et al., J. Virol. 72:2224 (1998); Halbert et al., J. Virol. 74:1524 (2000); Halbert et al., J. Virol. 75:6615 (2001); and Auricchio et al., Hum. Molec. Genet. 10:3075 (2001), the disclosures of each of which are incorporated herein by reference as they pertain to AAV vectors for gene delivery.

Also useful in conjunction with the compositions and methods described herein are pseudotyped rAAV vectors. Pseudotyped vectors include AAV vectors of a given serotype (e.g., AAV9) pseudotyped with a capsid gene derived from a serotype other than the given serotype (e.g., AAV1, AAV2, AAV2quad(Y-F), AAV3, AAV4, AAV5, AAV6, AAV7, AAV8, etc.). Techniques involving the construction and use of pseudotyped rAAV virions are known in the art and are described, for instance, in Duan et al., J. Virol. 75:7662 (2001); Halbert et al., J. Virol. 74:1524 (2000);

Zolotukhin et al., Methods, 28:158 (2002); and Auricchio et al., Hum. Molec. Genet. 10:3075 (2001).

AAV virions that have mutations within the virion capsid may be used to infect particular cell types more effectively than non-mutated capsid virions. For example, suitable AAV mutants may have ligand insertion mutations for the facilitation of targeting AAV to specific cell types. The construction and characterization of AAV capsid mutants including insertion mutants, alanine screening mutants, and epitope tag mutants is described in Wu et al., J. Virol. 74:8635 (2000). Other rAAV virions that can be used in methods described herein include those capsid hybrids that are generated by molecular breeding of viruses as well as by exon shuffling. See, e.g., Soong et al., Nat. Genet., 25:436 (2000) and Kolman and Stemmer, Nat. Biotechnol. 19:423 (2001).

Pharmaceutical Compositions

The polynucleotides described herein (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)) may be operably linked to a transgene (e.g., a transgene encoding a protein of interest) and incorporated into a vehicle for administration into a patient, such as a human patient suffering from sensorineural hearing loss. Pharmaceutical compositions containing vectors, such as viral vectors, that contain a polynucleotide described herein operably linked to a therapeutic transgene can be prepared using methods known in the art. For example, such compositions can be prepared using, e.g., physiologically acceptable carriers, excipients or stabilizers (Remington: The Science and Practice of Pharmacology 22nd edition, Allen, L. Ed. (2013); incorporated herein by reference), and in a desired form, e.g., in the form of lyophilized formulations or aqueous solutions.

Mixtures of nucleic acid vectors (e.g., viral vectors) containing a polynucleotide described herein (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)) operably linked to a transgene may be prepared in water suitably mixed with one or more excipients, carriers, or diluents. Dispersions may also be prepared in glycerol, liquid polyethylene glycols, and mixtures thereof and in oils. Under ordinary conditions of storage and use, these preparations may contain a preservative to prevent the growth of microorganisms. The pharmaceutical forms suitable for injectable use include sterile aqueous solutions or dispersions and sterile powders for the extemporaneous preparation of sterile injectable solutions or dispersions (described in U.S. Pat. No. 5,466,468, the disclosure of which is incorporated herein by reference). In any case the formulation may be sterile and may be fluid to the extent that easy syringability exists. Formulations may be stable under the conditions of manufacture and storage and may be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For example, a solution containing a pharmaceutical composition described herein may be suitably buffered, if necessary, and the liquid diluent first rendered isotonic with sufficient saline or glucose. These particular aqueous solutions are especially suitable for intravenous, intramuscular, subcutaneous, and intraperitoneal administration. In this connection, sterile aqueous media that can be employed will be known to those of skill in the art in light of the present disclosure. For example, one dosage may be dissolved in 1 ml of isotonic NaCl solution and either added to 1000 ml of hypodermoclysis fluid or injected at the proposed site of infusion. Some variation in dosage will necessarily occur depending on the condition of the subject being treated. For local administration to the inner ear, the composition may be formulated to contain a synthetic perilymph solution. An exemplary synthetic perilymph solution includes 20-200 mM NaCl, 1-5 mM KCl, 0.1-10 mM $CaCl_2$), 1-10 mM glucose, and 2-50 mM HEPEs, with a pH between about 6 and 9 and an osmolality of about 300 mOsm/kg. The person responsible for administration will, in any event, determine the appropriate dose for the individual subject. Moreover, for human administration, preparations may meet sterility, pyrogenicity, general safety, and purity standards as required by FDA Office of Biologics standards.

Methods of Treatment

The compositions described herein may be administered to a subject having or at risk of developing sensorineural hearing loss by a variety of routes, such as local administration to the inner ear (e.g., administration into the perilymph or endolymph, such as through the oval window, round window, or semicircular canal (e.g., horizontal canal), or by transtympanic or intratympanic injection, e.g., administration to an IHC), intravenous, parenteral, intradermal, transdermal, intramuscular, intranasal, subcutaneous, percutaneous, intratracheal, intraperitoneal, intraarterial, intravascular, inhalation, perfusion, lavage, and oral administration. The most suitable route for administration in any given case will depend on the particular composition administered, the patient, pharmaceutical formulation methods, administration methods (e.g., administration time and administration route), the patient's age, body weight, sex, severity of the disease being treated, the patient's diet, and the patient's excretion rate. Compositions may be administered once, or more than once (e.g., once annually, twice annually, three times annually, bi-monthly, or monthly).

Subjects that may be treated as described herein are subjects having or at risk of developing sensorineural hearing loss. The compositions and methods described herein can be used to treat subjects having or at risk of developing damage to IHCs (e.g., damage related to acoustic trauma, disease or infection, head trauma, ototoxic drugs, or aging), subjects having or at risk of developing sensorineural hearing loss, deafness, or auditory neuropathy, subjects having tinnitus (e.g., tinnitus alone, or tinnitus that is associated with sensorineural hearing loss), subjects having a genetic mutation associated with hearing loss, or subjects with a family history of hereditary hearing loss, deafness, auditory neuropathy, or tinnitus. In some embodiments, the disease associated with damage to or loss of hair cells (e.g., IHCs) is an autoimmune disease or condition in which an autoimmune response contributes to hair cell damage or death. Autoimmune diseases linked to sensorineural hearing loss include autoimmune inner ear disease (AIED), polyarteritis nodosa (PAN), Cogan's syndrome, relapsing polychondritis, systemic lupus erythematosus (SLE), Wegener's granulomatosis, Sjögren's syndrome, and Behget's disease. Some infectious conditions, such as Lyme disease and syphilis can also cause sensorineural hearing loss (e.g., by triggering autoantibody production). Viral infections, such as rubella, cytomegalovirus (CMV), lymphocytic choriomeningitis virus (LCMV), HSV types 1 &2, West Nile virus (WNV), human immunodeficiency virus (HIV) varicella zoster virus (VZV), measles, and mumps, can also cause sensorineural hearing loss. In some embodiments, the subject has hearing loss that is associated with or results from loss of IHCs. The methods described herein may include a step of screening a subject for one or more mutations in genes known to be associated with hearing loss prior to treatment with or administration of the compositions described herein. A subject can be screened for a genetic mutation using standard methods known to those of skill in the art (e.g., genetic testing). The methods described herein may also include a step of assessing hearing function in a subject prior to treatment with or administration of the compositions described herein. Hearing can be assessed using standard tests, such as audiometry, auditory brainstem response (ABR), electrocochleography (ECOG), and otoacoustic emissions. These tests can also be used to assess hearing function in a subject after treatment with or administration of the compositions described herein. The compositions and methods described herein may also be administered as a preventative treatment to patients at risk of developing hearing loss, e.g., patients who have a family history of hearing loss (e.g., inherited hearing loss), patients carrying a genetic mutation associated with hearing loss who do not yet exhibit hearing impairment or patients exposed to risk factors for acquired hearing loss (e.g., acoustic trauma, disease or infection, head trauma, ototoxic drugs, or aging).

The compositions and methods described herein can be used to promote or induce hair cell regeneration in a subject (e.g., IHC regeneration). Subjects that may benefit from compositions that promote or induce IHC regeneration include subjects suffering from hearing loss as a result of loss of IHCs (e.g., loss of IHCs related to trauma (e.g., acoustic trauma or head trauma), disease or infection, ototoxic drugs, or aging), and subjects with abnormal IHCs (e.g., IHCs that do not function properly when compared to normal IHCs), damaged IHCs (e.g., IHC damage related to trauma (e.g., acoustic trauma or head trauma), disease or infection, ototoxic drugs, or aging), or reduced IHC numbers due to genetic mutations or congenital abnormalities. The compositions and methods described herein can also be used to promote or increase IHC survival (e.g., increase survival of damaged IHCs, promote repair of damaged IHCs, or preserve IHCs in a subject at risk of loss of IHCs (e.g., loss of IHCs due to age, exposure to loud noise, disease or infection, head trauma, or ototoxic drugs)). The compositions and methods described herein can also be used to promote or increase IHC maturation, which can lead to improved auditory function.

The compositions and methods described herein can also be used to prevent or reduce ototoxic drug-induced hair cell damage or death (e.g., IHC damage or death) in subjects who have been treated with ototoxic drugs, or who are currently undergoing or soon to begin treatment with ototoxic drugs. Ototoxic drugs are toxic to the cells of the inner ear, and can cause sensorineural hearing loss, tinnitus, or a combination of these symptoms. Drugs that have been found to be ototoxic include aminoglycoside antibiotics (e.g., gentamycin, neomycin, streptomycin, tobramycin, kanamycin, vancomycin, and amikacin), viomycin, antineoplastic drugs (e.g., platinum-containing chemotherapeutic agents, such as cisplatin, carboplatin, and oxaliplatin), loop diuretics (e.g., ethacrynic acid and furosemide), salicylates (e.g., aspirin, particularly at high doses), and quinine. In some embodiments, the methods described herein prevent or reduce hair cell damage or death (e.g., IHC damage or death) related to acoustic trauma, disease or infection, head trauma, or aging.

The transgene operably linked to a hair cell-specific promoter (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)) for treatment of a subject as described herein can be a transgene that encodes a protein expressed in healthy hair cells (e.g., IHCs, e.g., a protein that plays a role in IHC development, IHC function, IHC fate specification, IHC regeneration, IHC survival, or IHC maintenance, or a protein that is deficient in a subject with sensorineural hearing loss), another protein of interest (e.g., a therapeutic protein or a reporter protein, such as a fluorescent protein, lacZ, or luciferase), an siRNA, an ASO, a nuclease, or a microRNA. The transgene may be selected based on the cause of the subject's hearing loss (e.g., if the subject's hearing loss is associated with a particular genetic mutation, the transgene can be a wild-type form of the gene that is mutated in the subject, or if the subject has hearing loss associated with loss of hair cells, the transgene can encode a protein that promotes hair cell regeneration), the severity of the subject's hearing loss, the health of the subject's hair cells, the subject's age, the subject's family history of hearing loss, or other factors. The proteins that may be expressed by a transgene operably linked a hair cell-specific promoter for treatment of a subject as described herein include ACTG1, FSCN2, RDX, POU4F3, TRIOBP, TPRN, XIRP2, ATOH1, GF11, CHRNA9, CHRNA10, CIB3, CDH23, PCDH15, KNCN, DFNB59, OTOF, MKRN2OS, LHX3, TMC1, MYO15, MYO7A, MYO6, MYO3A, MYO3B, GRXCR1, PTPRQ, LCE6A, LOXHD1, ART1, ATP2B2, CIB2, CACNA2D4, CABP2, EPS8, EPS8L2, ESPN, ESPNL, PRPH2, STRC, SLC8A2, ZCCHC12, LRTOMT2, LRTOMT1, USH1C, ELFN1, TTC24, DYTN, KCP, CCER2, LRTM2, KCNA10, CLRN1, CLRN2, SKOR1, TCTEX1D1, FCRLB, SLC17A8, GRXCR2, BDNF, SERPINE3, NHLH1, HSP70, HSP90, ATF6, PERK, IRE1, WHRN, OCM, ISL1, NTF3, TMTC4 and BIP.

Treatment may include administration of a composition containing a nucleic acid vector (e.g., an AAV viral vector) containing an IHC-specific promoter described herein in various unit doses. Each unit dose will ordinarily contain a predetermined-quantity of the therapeutic composition. The quantity to be administered, and the particular route of administration and formulation, are within the skill of those in the clinical arts. A unit dose need not be administered as a single injection but may comprise continuous infusion over a set period of time. Dosing may be performed using a syringe pump to control infusion rate in order to minimize damage to the inner ear (e.g., the cochlea). In cases in which the nucleic acid vectors are AAV vectors (e.g., AAV1, AAV2, AAV2quad(Y-F), AAV3, AAV4, AAV5, AAV6, AAV7, AAV8, AAV9, AAV10, rh10, rh39, rh43, rh74, Anc80, Anc80L65, DJ/8, DJ/9, 7m8, PHP.B, PHP.eb, or PHP.S vectors), the viral vectors may be administered to the patient at a dose of, for example, from about $1\times10^9$ vector genomes (VG)/mL to about $1\times10^{16}$ VG/mL (e.g., $1\times10^9$ VG/mL, $2\times10^9$ VG/mL, $3\times10^9$ VG/mL, $4\times10^9$ VG/mL, $5\times10^9$ VG/mL, $6\times10^9$ VG/mL, $7\times10^9$ VG/mL, $8\times10^9$ VG/mL, $9\times10^9$ VG/mL, $1\times10^{10}$ VG/mL, $2\times10^{10}$ VG/mL, $3\times10^{10}$ VG/mL, $4\times10^{10}$ VG/mL, $5\times10^{10}$ VG/mL, $6\times10^{10}$ VG/mL, $7\times10^{10}$ VG/mL, $8\times10^{10}$ VG/mL, $9\times10^{10}$ VG/mL, $1\times10^{11}$ VG/mL, $2\times10^{11}$ VG/mL, $3\times10^1$ VG/mL, $4\times10^{11}$ VG/mL, $5\times10^{11}$ VG/mL, $6\times10^{11}$ VG/mL, $7\times10^{11}$ VG/mL, $8\times10^{11}$ VG/mL, $9\times10^{11}$ VG/mL, $1\times10^{12}$ VG/mL, $2\times10^{12}$ VG/mL, $3\times10^{12}$ VG/mL, $4\times10^{12}$ VG/mL, $5\times10^{12}$ VG/mL, $6\times10^{12}$ VG/mL, $7\times10^{12}$ VG/mL, $8\times10^{12}$ VG/mL, $9\times10^{12}$ VG/mL, $1\times10^{13}$ VG/mL, $2\times10^{13}$ VG/mL, $3\times10^{13}$ VG/mL, $4\times10^{13}$ VG/mL, $5\times10^{13}$ VG/mL, $6\times10^{13}$ VG/mL, $7\times10^{13}$ VG/mL, $8\times10^{13}$ VG/mL, $9\times10^{13}$ VG/mL, $1\times10^{14}$ VG/mL, $2\times10^{14}$ VG/mL, $3\times10^{14}$ VG/mL, $4\times10^{14}$ VG/mL, $5\times10^{14}$ VG/mL, $6\times10^{14}$ VG/mL, $7\times10^{14}$ VG/mL, $8\times10^{14}$ VG/mL, $9\times10^{14}$ VG/mL, $1\times10^{15}$ VG/mL, $2\times10^{15}$ VG/mL, $3\times10^{15}$ VG/mL, $4\times10^{15}$ VG/mL, $5\times10^{15}$ VG/mL, $6\times10^{15}$ VG/mL, $7\times10^{15}$ VG/mL, $8\times10^{15}$ VG/mL, $9\times10^{15}$ VG/mL, or $1\times10^{16}$ VG/mL) in a volume of 1 µL to 200 µL (e.g., 1, 2, 3, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, or 200 µL). The AAV vectors may be administered to the subject at a dose of about $1\times10^7$ VG/ear to about $2\times10^{15}$ VG/ear (e.g., $1\times10^7$ VG/ear, $2\times10^7$ VG/ear, $3\times10^7$ VG/ear, $4\times10^7$ VG/ear, $5\times10^7$ VG/ear, $6\times10^7$ VG/ear, $7\times10^7$ VG/ear, $8\times10^7$ VG/ear, $9\times10^7$ VG/ear, $1\times10^8$ VG/ear, $2\times10^8$ VG/ear, $3\times10^8$ VG/ear, $4\times10^8$ VG/ear, $5\times10^8$ VG/ear, $6\times10^8$ VG/ear, $7\times10^8$ VG/ear, $8\times10^8$ VG/ear, $9\times10^8$ VG/ear, $1\times10^9$ VG/ear, $2\times10^9$ VG/ear, $3\times10^9$ VG/ear, $4\times10^9$ VG/ear, $5\times10^9$ VG/ear, $6\times10^9$ VG/ear, $7\times10^9$ VG/ear, $8\times10^9$ VG/ear, $9\times10^9$ VG/ear, $1\times10^{10}$ VG/ear, $2\times10^{10}$ VG/ear, $3\times10^{10}$ VG/ear, $4\times10^{10}$ VG/ear, $5\times10^{10}$ VG/ear, $6\times10^{10}$ VG/ear, $7\times10^{10}$ VG/ear, $8\times10^{10}$ VG/ear, $9\times10^{10}$ VG/ear, $1\times10^{11}$ VG/ear, $2\times10^{11}$ VG/ear, $3\times10^{11}$ VG/ear, $4\times10^{11}$ VG/ear, $5\times10^{11}$ VG/ear, $6\times10^{11}$ VG/ear, $7\times10^{11}$ VG/ear, $8\times10^{11}$ VG/ear, $9\times10^{11}$ VG/ear, $1\times10^{12}$ VG/ear, $2\times10^{12}$ VG/ear, $3\times10^{12}$ VG/ear, $4\times10^{12}$ VG/ear, $5\times10^{12}$ VG/ear, $6\times10^{12}$ VG/ear, $7\times10^{12}$ VG/ear, $8\times10^{12}$ VG/ear, $9\times10^{12}$ VG/ear, $1\times10^{13}$ VG/ear, $2\times10^{13}$ VG/ear, $3\times10^{13}$ VG/ear, $4\times10^{13}$ VG/ear, $5\times10^{13}$ VG/ear, $6\times10^{13}$ VG/ear, $7\times10^{13}$ VG/ear, $8\times10^{13}$ VG/ear, $9\times10^{13}$ VG/ear, $1\times10^{14}$ VG/ear, $2\times10^{14}$ VG/ear, $3\times10^{14}$ VG/ear, $4\times10^{14}$ VG/ear, $5\times10^{14}$ VG/ear, $6\times10^{14}$ VG/ear, $7\times10^{14}$ VG/ear, $8\times10^{14}$ VG/ear, $9\times10^{14}$ VG/ear, $1\times10^{15}$ VG/ear, or $2\times10^{15}$ VG/ear).

The compositions described herein are administered in an amount sufficient to improve hearing, reduce tinnitus, increase expression of a protein encoded by a transgene operably linked to an IHC-specific promoter, increase function of a protein encoded by a transgene operably linked to an IHC-specific promoter, prevent or reduce IHC damage (e.g., IHC damage related to acoustic trauma, head trauma, ototoxic drugs, disease or infection, or aging), prevent or reduce IHC death (e.g., ototoxic drug-induced IHC death, noise-related IHC death, age-related IHC death, disease or infection-related IHC death, or head trauma-related IHC death), promote or increase IHC development, increase IHC numbers (e.g., promote or induce IHC regeneration), promote or increase IHC survival, promote or increase IHC maturation, or improve IHC function. Hearing may be evaluated using standard hearing tests (e.g., audiometry, ABR, electrocochleography (ECOG), and otoacoustic emissions) and may be improved by 5% or more (e.g., 5%, 10%, 15%, 20%, 30%, 40%, 50%, 60%, 70%, 80%, 90%, 100%, 125%, 150%, 200% or more) compared to hearing measurements obtained prior to treatment. In some embodiments, the compositions are administered in an amount sufficient to improve the subject's ability to understand speech. The compositions described herein may also be administered in an amount sufficient to slow or prevent the development or progression of sensorineural hearing loss (e.g., in subjects who carry a genetic mutation associated with hearing loss, who have a family history of hearing loss (e.g., hereditary hearing loss), or who have been exposed to risk factors associated with hearing loss (e.g., ototoxic drugs, head trauma, disease or infection, or acoustic trauma) but do not exhibit hearing impairment, or in subjects exhibiting mild to moderate hearing loss). Expression of the protein encoded by the transgene operably linked to an IHC-specific promoter in the nucleic acid vector administered to the subject may be evaluated using immunohistochemistry, Western blot analysis, quantitative real-time PCR, or other methods known in the art for detection protein or mRNA, and may be increased by 5% or more (e.g., 5%, 10%, 15%, 20%, 30%, 40%, 50%, 60%, 70%, 80%, 90%, 100%, 125%, 150%, 200% or more) compared to expression prior to administration of the compositions described herein. IHC numbers, IHC function, or function of the protein encoded by the nucleic acid vector administered to the subject may be evaluated indirectly based on hearing tests, and may be increased by 5% or more (e.g., 5%, 10%, 15%, 20%, 30%, 40%, 50%, 60%, 70%, 80%, 90%, 100%, 125%, 150%, 200% or more) compared to IHC numbers, IHC function, or function of the protein prior to administration of the compositions described herein. IHC damage or death may be reduced by 5% or more (e.g., 5%, 10%, 15%, 20%, 30%, 40%, 50%, 60%, 70%, 80%, 90%, 100%, 125%, 150%, 200% or more) compared to IHC damage and death typically observed in untreated subjects. These effects may occur, for example, within 1 week, 2 weeks, 3 weeks, 4 weeks, 5 weeks, 6 weeks, 7 weeks, 8 weeks, 9 weeks, 10 weeks, 15 weeks, 20 weeks, 25 weeks, or more, following administration of the compositions described herein. The patient may be evaluated 1 month, 2 months, 3 months, 4 months, 5 months, 6 months or more following administration of the composition depending on the dose and route of administration used for treatment. Depending on the outcome of the evaluation, the patient may receive additional treatments.

Kits

The compositions described herein can be provided in a kit for use in treating sensorineural hearing loss. Compositions may include a polynucleotide described herein (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to any one of the promoter sequences listed in Table 2 (e.g., any one of SEQ ID NOs: 1-3)), nucleic acid vectors containing such polynucleotides, and nucleic acid vectors containing a polynucleotide described herein operably linked to a transgene encoding a protein of interest (e.g., a protein that can be expressed in hair cells to treat hearing loss). The nucleic acid vectors may be packaged in an AAV virus capsid (e.g., AAV1, AAV2, AAV2quad(Y-F), AAV6, AAV8, AAV9, Anc80, Anc80L65, DJ/9, 7m8, or PHP.B). The kit can further include a package insert that instructs a user of the kit, such as a physician, to perform the methods described herein. The kit may optionally include a syringe or other device for administering the composition.

EXAMPLES

The following examples are put forth so as to provide those of ordinary skill in the art with a description of how the compositions and methods described herein may be used, made, and evaluated, and are intended to be purely exemplary of the invention and are not intended to limit the scope of what the inventors regard as their invention.

Example 1: Generation of a Murine Calcium Binding Protein 2 (CABP) Promoter

To facilitate inner hair cell (IHC)-specific expression of exogenous transgenes in a target cell, a murine CABP2 promoter was constructed. A 1526 base pair (bp) regulatory element (SEQ ID NO: 1) was generated by combining genomic regions upstream of the translational start site of the murine CABP2 gene. These regions contain annotated summits of single cell (sc)-Assay for Transposase Accessible Chromatin (ATAC)-sequencing (seq) peaks in hair cells of the cochlea and regions of high mammalian conservation (FIG. 1, black rectangles). In order to generate a promoter fragment that is selectively active in IHCs, the most distal (5') fragment was extended to include a genomic region with annotated sc-ATACseq peaks for IHCs but not outer hair cells (OHCs) or vestibular supporting cells (FIG. 1, dashed rectangle). The combined genomic regions of the murine CABP2 (1526 bp) promoter fragment (SEQ ID NO: 1) span across 2,257 bp of the mouse genome (GRCm38/mm10) assembly (chr19:4,080,449-4,082,705).

Figure 2A:
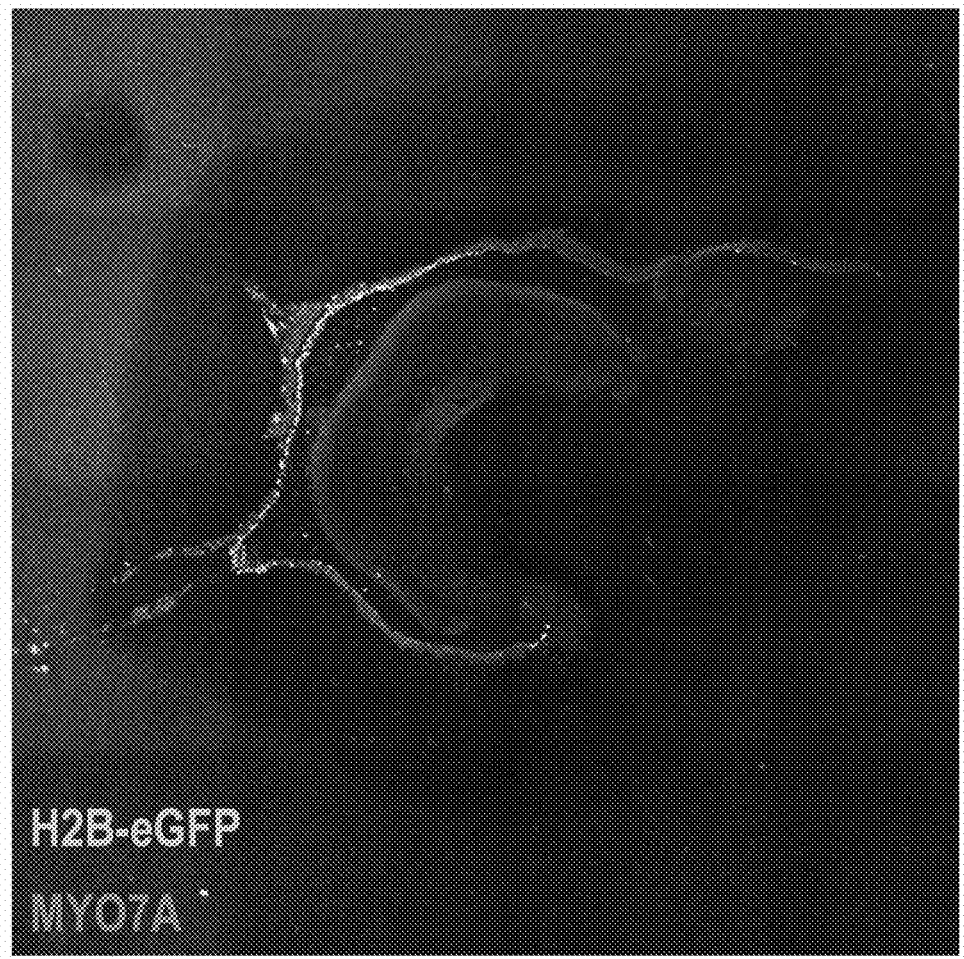
Figure 2B:
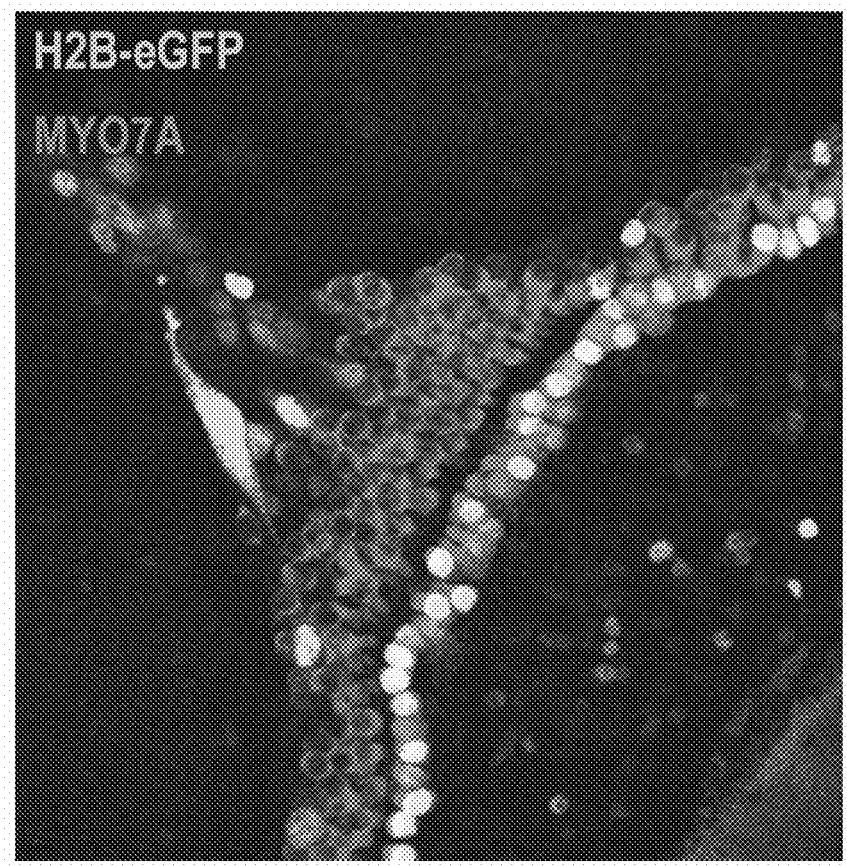
Figure 2C:
Figure 2D:
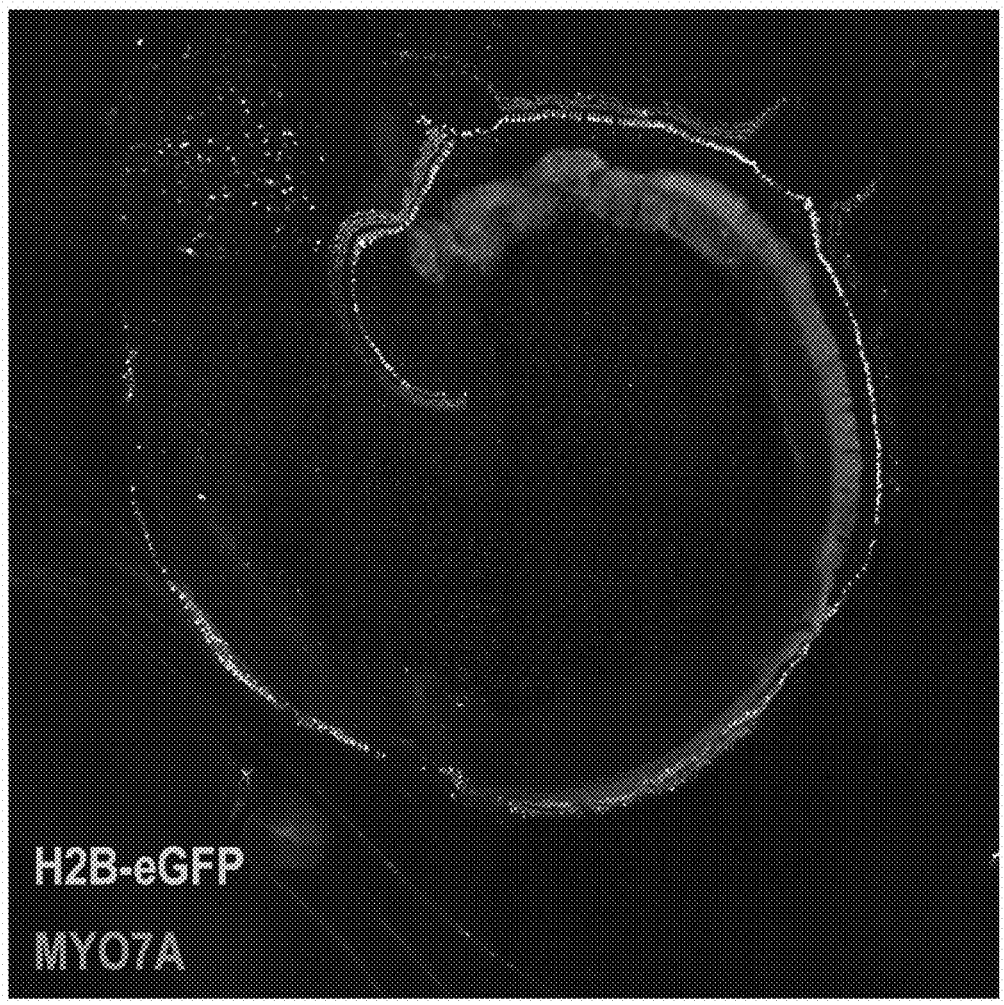
Figure 2E:
Figure 2G:
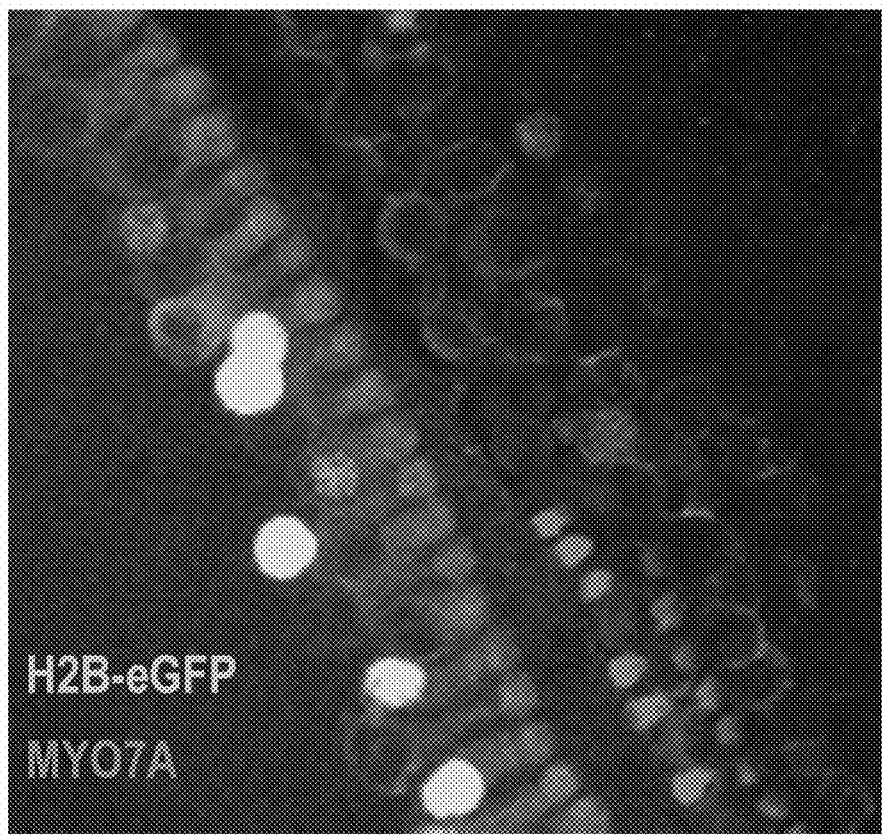

Example 2: CABP2 Promoter Sequence Induces Transgene Expression in IHCs in Murine Cochlea In Vitro To determine the efficacy of the constructed murine CABP2 promoter (SEQ ID NO: 1) in inducing transgene expression in IHCs in vitro, mouse cochlear explants were prepared from postnatal day 1 (P1) B6/CAST-Cdh23Ahl+/Kjn mice. Cultured murine cochlear explants were treated with adeno-associated viral (AAV) plasmids containing the human histone H2B gene fused to a green fluorescent protein (GFP) gene (AAV1-mCABP2-H2B-GFP) at a viral dose of $1 \times 10^{11}$ viral genomes (vg)/culture. Explants were incubated for 72 hours, fixed, and immunostained with an anti-Myosin 7a (MYO7A) antibody to label all hair cells and an anti-GFP antibody to measure CABP2 promoter-driven GFP expression. Fluorescence imaging was performed on a Zeiss LSM 780 microscope and displayed as maximum z-projections. GFP expression was observed in specifically in cochlear IHCs (FIGS. 2A-2C). In another set of experiments, cochlear explants were prepared from P4 mouse pups C57BL/6NTac. Cultured explants were treated with AAV1-CABP2-H2B-GFP at a viral dose of $1 \times 10^{11}$ vg/culture. Explants were incubated, fixed, and immunostained with an anti-MYO7A and anti-GFP antibody. Imaging was performed as described above. GFP expression was observed in cochlear IHCs (FIGS. 2D-2G).

Example 3: Administration of a Composition Containing a Nucleic Acid Vector Containing a Hair Cell-Specific Promoter to a Subject with Sensorineural Hearing Loss According to the methods disclosed herein, a physician of skill in the art can treat a patient, such as a human patient, with sensorineural hearing loss so as to improve or restore hearing. To this end, a physician of skill in the art can administer to the human patient a composition containing an AAV vector (e.g., AAV1, AAV2, AAV2quad(Y-F), AAV6, AAV9, Anc80, Anc80L65, DJ/9, 7m8, or PHP.B) containing an inner hair cell-specific promoter (e.g., a polynucleotide having at least 85% sequence identity (e.g., 85%, 86%, 87%, 88%, 89%, 90%, 91%, 92%, 93%, 94%, 95%, 96%, 97%, 98%, 99%, or more, sequence identity) to the sequence of any one of SEQ ID NOs: 1-3) operably linked to a transgene that encodes a therapeutic protein. The composition containing the AAV vector may be administered to the patient, for example, by local administration to the inner ear (e.g., injection into the perilymph), to treat sensorineural hearing loss.

Following administration of the composition to a patient, a practitioner of skill in the art can monitor the expression of the therapeutic protein encoded by the transgene, and the patient's improvement in response to the therapy, by a variety of methods. For example, a physician can monitor the patient's hearing by performing standard tests, such as audiometry, ABR, electrocochleography (ECOG), and otoacoustic emissions following administration of the composition. A finding that the patient exhibits improved hearing in one or more of the tests following administration of the composition compared to hearing test results prior to administration of the composition indicates that the patient is responding favorably to the treatment. Subsequent doses can be determined and administered as needed.

Other Embodiments

Various modifications and variations of the described invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention. Other embodiments are in the claims.

The invention claimed is:

1. A nucleic acid vector comprising a polynucleotide having at least 85% sequence identity to SEQ ID NO: 1.

2. The nucleic acid vector of claim 1, wherein the polynucleotide is operably linked to a transgene.

3. The nucleic acid vector of claim 2, wherein the transgene is a heterologous transgene.

4. The nucleic acid vector of claim 2, wherein the transgene encodes a therapeutic protein, a short interfering RNA (siRNA), an antisense oligonucleotide (ASO), a nuclease, or is a microRNA.

5. The nucleic acid vector of claim 4, wherein the therapeutic protein is selected from the group consisting of Actin Gamma 1 (ACTG1), Fascin Actin-Bundling Protein 2 (FSCN2), Radixin (RDX), POU Class 4 Homeobox 3 (POU4F3), Trio And F-Actin Binding Protein (TRIOBP), Taperin (TPRN), Xin Actin Binding Repeat Containing 2 (XIRP2), Atonal BHLH Transcription Factor (ATOH1), Growth Factor Independent 1 Transcriptional Repressor (GFI1), Cholinergic Receptor Nicotinic Alpha 9 Subunit (CHRNA9), Cholinergic Receptor Nicotinic Alpha 10 Subunit (CHRNA10), Calcium and Integrin Binding Family Member 3 (CIB3), Cadherin Related 23 (CDH23), Protocadherin Related 15 (PCDH15), Kinocilin (KNCN), Pejvakin (DFNB59), Otoferlin (OTOF), MKRN2 Opposite Strand (MKRN2OS), Lim Homeobox 3 (LHX3), Transmembrane Channel Like 1 (TMC1), Myosin XV (MYO15), Myosin 7A (MYO7A), Myosin VI (MYO6), Myosin IIIA (MYO3A), Myosin IIIB (MYO3B), Glutaredoxin And Cystein Rich Domain Containing 1 (GRXCR1), Protein Tyrosine Phosphatase Receptor Type Q (PTPRQ), Late Cornified Envelope 6A (LCE6A), Lipoxygenase Homology Domains 1 (LOXHD1), ADP-Ribosyltransferase 1 (ART1), ATPase Plasma Membrane $Ca^{2+}$ Transporting 2 (ATP2B2), Calcium and Integrin Binding Family Member 2 (CIB2), Calcium Voltage-Gated Channel Auxilary Subunit Alpha2delta4 (CACNA2D4), Calcium-Binding Protein 2 (CABP2), Epidermal growth Factor Receptor Pathway Substrate 8 (EPS8), EPS8 Like 2 (EPS8L2), Espin (ESPN), Espin Like (ESPNL), Peripherin 2 (PRPH2), Stereocilin (STRC), Solute Carrier Family 8 Member A2 (SLC8A2), Zinc Finger CCHC-Type Containing 12 (ZCCHC12), Leucine Rich Transmembrane And O-Methyltransferase Domain Containing 2 (LRTOMT2), Leucine Rich Transmembrane And O-Methyltransferase Domain Containing 1 (LRTOMT1), USH1 Protein Network Component Harmonin (USH1C), Extracellular Leucine Rich Repeat And Fibronectin Type III Domain Containing 1 (ELFN1), Tetratricopeptide Repeat Domain 24 (TTC24), Dystrotelin (DYTN), Kielin Cysteine Rich BMP Regulator (KCP), Coiled-Coil Glutamate Rich Protein 2 (CCER2), Leucine Rich Repeats And Transmembrane Domains 2 (LRTM2), Potassium Voltage-Gated Channel Subfamily A Member 10 (KCNA10), Clarin 1 (CLRN1), Clarin 2 (CLRN2), SKI Family Transcriptional Corepressor 1 (SKOR1), Tctex1 Domain Containing 1 (TCTEX1D1), Fc Receptor Like B (FCRLB), Solute Carrier Family 17 Member 8 (SLC17A8), Glutaredoxin And Cysteine Rich Domain Containing 2 (GRXCR2), Brain Derived Neurotrophic Factor (BDNF), Serpin Family E Member 3 (SERPINE3), Nescient Helix-Loop-Helix 1 (NHLH1), Heat Shock 70KDa Protein 4 (HSP70), Heat Shock 90 kDa Protein 1, Alpha (HSP90), Activating Transcription Factor 6 (ATF6), Eukaryotic Translation Initiation Factor 2 Alpha Kinase 3 (PERK), Inositol-Requiring Protein 1 (IRE1), Whirlin (WHRN), Oncomodulin (OCM), LIM Homeobox 1 (Isl1), Neurotrophin 3 (NTF3), Transmembrane and Tetratricopeptide Repeat Containing 4 (TMTC4), and Binding-Immunoglobulin Protein (BIP).

6. A cell comprising the nucleic acid vector of claim 1.

7. A nucleic acid vector comprising a polynucleotide having at least 85% sequence identity to SEQ ID NO: 3.

8. The nucleic acid vector of claim 7, wherein the polynucleotide is operably linked to a transgene.

9. The nucleic acid vector of claim 8, wherein the transgene is a heterologous transgene.

10. The nucleic acid vector of claim 8, wherein the transgene encodes a therapeutic protein, a short interfering RNA (siRNA), an antisense oligonucleotide (ASO), a nuclease, or is a microRNA.

11. The nucleic acid vector of claim 10, wherein the therapeutic protein is selected from the group consisting of Actin Gamma 1 (ACTG1), Fascin Actin-Bundling Protein 2

(FSCN2), Radixin (RDX), POU Class 4 Homeobox 3 (POU4F3), Trio And F-Actin Binding Protein (TRIOBP), Taperin (TPRN), Xin Actin Binding Repeat Containing 2 (XIRP2), Atonal BHLH Transcription Factor (ATOH1), Growth Factor Independent 1 Transcriptional Repressor (GFI1), Cholinergic Receptor Nicotinic Alpha 9 Subunit (CHRNA9), Cholinergic Receptor Nicotinic Alpha 10 Subunit (CHRNA10), Calcium and Integrin Binding Family Member 3 (CIB3), Cadherin Related 23 (CDH23), Protocadherin Related 15 (PCDH15), Kinocilin (KNCN), Pejvakin (DFNB59), Otoferlin (OTOF), MKRN2 Opposite Strand (MKRN2OS), Lim Homeobox 3 (LHX3), Transmembrane Channel Like 1 (TMC1), Myosin XV (MYO15), Myosin 7A (MYO7A), Myosin VI (MYO6), Myosin IIIA (MYO3A), Myosin IIIB (MYO3B), Glutaredoxin And Cystein Rich Domain Containing 1 (GRXCR1), Protein Tyrosine Phosphatase Receptor Type Q (PTPRQ), Late Cornified Envelope 6A (LCE6A), Lipoxygenase Homology Domains 1 (LOXHD1), ADP-Ribosyltransferase 1 (ART1), ATPase Plasma Membrane Ca2+Transporting 2 (ATP2B2), Calcium and Integrin Binding Family Member 2 (CIB2), Calcium Voltage-Gated Channel Auxilary Subunit Alpha2delta4 (CACNA2D4), Calcium-Binding Protein 2 (CABP2), Epidermal growth Factor Receptor Pathway Substrate 8 (EPS8), EPS8 Like 2 (EPS8L2), Espin (ESPN), Espin Like (ES-PNL), Peripherin 2 (PRPH2), Stereocilin (STRC), Solute Carrier Family 8 Member A2 (SLC8A2), Zinc Finger CCHC-Type Containing 12 (ZCCHC12), Leucine Rich Transmembrane And O-Methyltransferase Domain Containing 2 (LRTOMT2), Leucine Rich Transmembrane And O-Methyltransferase Domain Containing 1 (LRTOMT1), USH1 Protein Network Component Harmonin (USH1C), Extracellular Leucine Rich Repeat And Fibronectin Type III Domain Containing 1 (ELFN1), Tetratricopeptide Repeat Domain 24 (TTC24), Dystrotelin (DYTN), Kielin Cysteine Rich BMP Regulator (KCP), Coiled-Coil Glutamate Rich Protein 2 (CCER2), Leucine Rich Repeats And Transmembrane Domains 2 (LRTM2), Potassium Voltage-Gated Channel Subfamily A Member 10 (KCNA10), Clarin 1 (CLRN1), Clarin 2 (CLRN2), SKI Family Transcriptional Corepressor 1 (SKOR1), Tctex1 Domain Containing 1 (TCTEX1D1), Fc Receptor Like B (FCRLB), Solute Carrier Family 17 Member 8 (SLC17A8), Glutaredoxin And Cysteine Rich Domain Containing 2 (GRXCR2), Brain Derived Neurotrophic Factor (BDNF), Serpin Family E Member 3 (SERPINE3), Nescient Helix-Loop-Helix 1 (NHLH1), Heat Shock 70KDa Protein 4 (HSP70), Heat Shock 90 kDa Protein 1, Alpha (HSP90), Activating Transcription Factor 6 (ATF6), Eukaryotic Translation Initiation Factor 2 Alpha Kinase 3 (PERK), Inositol-Requiring Protein 1 (IRE1), Whirlin (WHRN), Oncomodulin (OCM), LIM Homeobox 1 (Isl1), Neurotrophin 3 (NTF3), Transmembrane and Tetratricopeptide Repeat Containing 4 (TMTC4), and Binding-Immunoglobulin Protein (BIP).

12. A cell comprising the nucleic acid vector of claim 7.

* * * * *

SEQUENCE LISTING

```
<160> NUMBER OF SEQ ID NOS: 3

<210> SEQ ID NO 1
<211> LENGTH: 1526
<212> TYPE: DNA
<213> ORGANISM: Artificial Sequence
<220> FEATURE:
<223> OTHER INFORMATION: Synthetic Construct

<400> SEQUENCE: 1
aacatgagag aatatgcttt ctgggcactg tttttgagga tgtccctgcc tggtgcagat      60
```

```
ggtctgaaaa gccacacgct gggtcctgtg aacaatgaca agaacccctt ccaacacttg      120
accgcctggc cagagtccac acacctctca ggcttgcctg tcccagatct cagtcttctt      180
cacgctgtgt ttagcctgtt ccctcctcat ggaggccacc tactcccagt gaccttatct      240
cacctccaca cacagcaagg cctccctctg agaggtagcc tgtgggactg tccttgtatt      300
ttcccattga ctatagtcct acattgctga aggtgctgcc cctaccacgt caaaagctct      360
agaggtgaag ctgacaggct gctcccaggc cgagggtgac agtgccaccc tctggtgccc      420
tctctctact gtctatacgt tctacagagg ccactgatgt tctcccccttc ctcccgaggg      480 ctctgcccag tgttacttga gagttccgg actctgccag atcactgttg actgtcagcc       540
tcattcaggg ctacttgaca tcagcagaac aggccatgtc tctagtgtgc agagccttcc      600
tctcacctgc ctgggtgggt attccgaagc acaacagagt ctttctgtat gctaggcaag      660
cactctacca agggagatat aggccctgcc tctctcccca ctctccctcc cgtccttgat      720
gtttgcaagc tagtcactga atcgatgata gagtcactag ctcagatggc agacatggca      780
tgggatctgg ttccctggga caaaggctgg tgcagagggc atgtgaataa atcatgaggg      840
gcccacgaca ggccagcagg ccacagctga cctcattctg gaagtgagag taagctgctg      900
tgtggtgagt ggctgcagtg tggcaagggg caagggtctg tgtggcacct ttattcttgt      960
tccttgagaa gagcttacag gtcagggggg tggttcaccc aggaggtggg gaagcagagg     1020
tggaaacaga ggtatcctgg gactccagat ggggaagaga ggagcaggtg gcatactttt     1080
ccagaatctt ggagctgtcc tgggaaagag agggtcctga gagtactggt ctaccaagac     1140
atagcatagg ccaagccaaa gcagatggag agcaagcagg atacggagca ggaagaatgt     1200
gttaggacca cgaaccagag aagtgcaggc aggatatggg actgaaggag ccagccagc      1260 gtgggagcct ggccacctgg atcagcgagg agccccaggg tggagtctgt ggtcctgtga     1320
aggttgggaa gcactctagg aggtaggtga agatttcaaa gatggattat gggagcagca     1380
atggaagaag acagtgacct tagaggactc gggctcttct aaccccccaga gctagaaaca    1440 aaaacatagc cacagcttgc actgagccac cgacctacag gtggaggaga cccagctgga    1500
acagaaaacg taccacacct acatcc                                         1526
```

<210> SEQ ID NO 2
<211> LENGTH: 2500
<212> TYPE: DNA
<213> ORGANISM: Homo sapiens

<400> SEQUENCE: 2

```
tctgggagtt gaagagcggg cagctggtg gggagtgggc tggggtcatg gcaaggaagc       60
ctgagaggcc agcaggggct gcccggccca cctccacccc ttttccttga gaagcaagag     120
gttgaaggtc agcaggacca ggtggaggtc ctggcagaac gcaggggaggt gggcaatgca    180 gagggacccct ggggagagga gggggctagc acagagggac cctggggagg agggagggaa   240
ggagggggct agcacagagg gaccctgggg aggagggagg aaggaggggg gcagcacaga     300
gggaccctgg ggaggaggga gggaggcagg gaggtgggca gcacagacgg accctagggc    360
tctgggctgg ggagatgggg aaggcctttc cagaattctg gagctctcct gggagcggga    420
tggtggggag aataggaaga gcaaggaagg acagacagaa agaccaatgc aagaaaggac    480
cttgcagcaa cagagggaag gagccagcag agagatgggc tgagtgggtc agagacggca   540
gagacaccac tggatccaga ctgacagaga tggcggcgag tcagagggga tggagacggg   600
```

| | |
|---|---:|
| gctgcaggca aaacagacac agaggcagag ggggcacaga ggggcaggcg gtgagatgga | 660 |
| aactgagcaa ggaggtgtgt ggggcatcag gtgcgcgtga gccagagaga tgcaggcaga | 720 |
| acactgcggg ggaggaggcc aaaggcaggc aggagggccg accactgggg ccacaaggat | 780 |
| gatcaggtgg agccccgggc acagtctgtg accagcatga ggggcttcac caggctgaca | 840 |
| gggccacacg aggggccacg gggagctagg gaggatacaa gactctgggg acacggggct | 900 |
| ctcccagttt atggaggaag ggacagaaag aagagtagca gggacccagg ccacacctgt | 960 |
| ggctgcccac aagaccactc tcccgcagga ctggggaggc cggacggagc agcgtccctc | 1020 |
| agccaggagg aggtaccaag ccctcatctc catggcccag ccccagggcc agcagagggg | 1080 |
| cagcctccca acggggggacc ccagcccctc tgagggcact ccaggaacca gccaggcccc | 1140 |
| tggcagccca gcagccaccc ggcgacgaga gcttctccgg gagctcgagg cccaggtgca | 1200 |
| ggcagcctac gggcaggtaa tgcgggcagg ggtatgaggg gaccaggaac aaagagcagg | 1260 |
| gaccccacac cccaactggg ggccccggag gacagaccca ggacttagtc cagggagggg | 1320 |
| accaggaggc agagtccaat gggagactct ctgaggtcgg cagggccggg gtggcttccc | 1380 |
| ttcccaatct ccaccctcac cgagccctgt cactgcccac agcacatagg cggttccctt | 1440 |
| ctgctcctca tccaagggcg gggcaccagt ccaggcaggg ggagccaagt gcaagcaatt | 1500 |
| ggggctaccc cgaggtgagg agcccagggc ccagctgggg tcctggcagg agaggcagg | 1560 |
| ggcttcctgg gctgagccaa gtggctgcct ctttctggga ggctgtgtgg gaaggcccgc | 1620 |
| gtgtccatac caaccggaat ctgtgccatt cggagggccc agcccaccct ggcacactgc | 1680 |
| acgcctgcct tcctcctcct gggacccagg ccctgcttct gaagacatta aatctccccct | 1740 |
| gattgggaga gattagaggc aggggttggg ggagggtgct ggagaagggg cgtctggaag | 1800 |
| accctcagga ggcagtctgg ggaggctgtg ctctccaggg ggccttgggc ccaagtggct | 1860 |
| cccctcagca gcggagacgc tcaaagataa tcccggatta ggacccaagc cccaggccca | 1920 |
| agtccccgg ctgccacccc gccccgatc ttccccacaa aacccagga aaatccccgg | 1980 |
| cagtactccc aggctctcat cgggagcagc tgggggctgg caggagtcct caggcagcag | 2040 |
| catccgccga ggcccacccg ggccaccccc ggggttccag gcctggcatg gttcagggcc | 2100 |
| catgggaac tgtgccaagc ggccctggcg ccggggccct aaggtaggag gggtcagggg | 2160 |
| agaaacccag gccaggaggc tggaatggac cctgagggtc agatgggatg ggcagagccc | 2220 |
| tccgagggcc gggcgggggtt ggggggctgcc cactgcccca ggtggagatt ttttttcctgg | 2280 |
| aagccacagc ctctggccat cctgatcttg gctccaccg acctctgggt ctcccctgcc | 2340 |
| aggctccagg tcccccagct gcccgtccag ctgcccatc ccggctgcag gtccccgctc | 2400 |
| tctgctagcc agcctccatc taggagacag agctgggcac aaggtccctc tctgccgctg | 2460 |
| gctttctcag tggccttggc caagtctctt gccttttctg | 2500 |

<210> SEQ ID NO 3
<211> LENGTH: 910
<212> TYPE: DNA
<213> ORGANISM: Artificial Sequence
<220> FEATURE:
<223> OTHER INFORMATION: Synthetic Construct

<400> SEQUENCE: 3

| | |
|---|---:|
| acagatgaat aaatcatgag gggcctggaa tggagccggg gcaggatgat gacctcattc | 60 |
| tgggagttga agagcgggca gctggtgggg gagtgggctg gggtcatggc aagggacaga | 120 |
| aagaagagta gcagggaccc aggccacacc tgtggctgcc cacaagacca ctctcccgca | 180 |

```
ggactgggga ggccggacgg agcagcgtcc ctcagccagg aggaggtacc aagccctcat    240
ctccatggcc cagccccagg gcccagcaga gggcagcctc ccaacggggg accccagccc    300
ctctgagggc actccaggaa ccagccaggc ccctggcagc ccagcagcca cccggcgacg    360
agagcttctc cgggagctcg aggcccaggt gcaggcagcc tacgggcagg taatgcgggc    420
aggggtatga ggggaccagg aacaaagagc agggacccca caccagatta gaggcagggg    480 ttggggagg gtgctggaga aggggcgtct ggaagaccct caggaggcag tctggggagg     540
ctgtgctctc caggggcct tgggcccaag tggctcccct cagcagcgga gacgctcaaa     600
gataatcccg gattaggacc caagcccag gcccaagtcc cccgcctgcc cacccgcccc     660
cgatcttccc cacaaaaccc caggaaaatc cccggcagta ctcccaggct ctcatcggga    720
gcagctgggg gctggcagga gtcggcagca gcatccgccg aggcccaccc gggccacccc    780
cggggttcca ggcctggcat ggttcagggc ccatgggaa ctgtgccaag cggccctggc     840
gccggggccc taaggtagga ggggtcaggg gagaaaccca ggccaggagg ctggaatgga    900
ccctgagggt                                                           910
```